United States Patent
Takano

(10) Patent No.: US 10,383,088 B2
(45) Date of Patent: Aug. 13, 2019

(54) APPARATUS AND METHOD FOR SCHEDULING A PLURALITY OF COMPONENT CARRIERS

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 276 days.

(21) Appl. No.: 15/027,548

(22) PCT Filed: Oct. 21, 2014

(86) PCT No.: PCT/JP2014/077957
§ 371 (c)(1),
(2) Date: Apr. 6, 2016

(87) PCT Pub. No.: WO2015/093141
PCT Pub. Date: Jun. 25, 2015

(65) Prior Publication Data
US 2016/0249324 A1  Aug. 25, 2016

(30) Foreign Application Priority Data
Dec. 20, 2013 (JP) ................................. 2013-263999

(51) Int. Cl.
*H04W 72/04* (2009.01)
*H04W 72/00* (2009.01)
*H04W 4/06* (2009.01)

(52) U.S. Cl.
CPC .......... *H04W 72/005* (2013.01); *H04W 4/06* (2013.01); *H04W 72/00* (2013.01); *H04W 72/042* (2013.01); *H04W 72/0453* (2013.01)

(58) Field of Classification Search
CPC ............ H04W 72/005; H04W 72/042; H04W 72/0453; H04W 4/06
See application file for complete search history.

(56) References Cited

U.S. PATENT DOCUMENTS

| | | | | |
|---|---|---|---|---|
| 9,049,566 B2* | 6/2015 | Gou | .......................... | H04L 5/001 |
| 2010/0272004 A1* | 10/2010 | Maeda | .................. | H04L 5/0007 |
| | | | | 370/312 |
| 2010/0304774 A1* | 12/2010 | Lee | ...................... | H04W 72/005 |
| | | | | 455/509 |
| 2010/0322135 A1* | 12/2010 | Van Lieshout | ..... | H04W 72/005 |
| | | | | 370/312 |

(Continued)

OTHER PUBLICATIONS

International Search Report dated Dec. 16, 2014, in PCT/JP2014/077957 filed Oct. 21, 2014.

(Continued)

*Primary Examiner* — Lan-Huong Truong
(74) *Attorney, Agent, or Firm* — Xsensus LLP

(57) ABSTRACT

[Object] To make it possible to reduce the load related to MBMS for the terminal device supporting carrier aggregation.
[Solution] There is provided an apparatus including an acquisition unit configured to acquire specific information used to specify a physical multicast channel (PMCH) of two or more component carriers including a first component carrier, and a control unit configured to control transmission of the specific information on the first component carrier.

17 Claims, 35 Drawing Sheets

(56) References Cited

U.S. PATENT DOCUMENTS

| | | | |
|---|---|---|---|
| 2012/0163273 A1* | 6/2012 | Na | H04W 4/06 370/312 |
| 2012/0236775 A1* | 9/2012 | Wang | H04W 72/005 370/312 |
| 2012/0300732 A1* | 11/2012 | Ode | H04B 7/022 370/329 |
| 2013/0195058 A1* | 8/2013 | Ode | H04W 72/048 370/329 |
| 2013/0267202 A1* | 10/2013 | Palanigounder | H04L 12/1868 455/411 |
| 2013/0294318 A1* | 11/2013 | Amerga | H04W 4/06 370/312 |

OTHER PUBLICATIONS

"3$^{rd}$ Generation Partnership Project; Technical Specification Group Radio Access Network; Evolved Universal Terrestrial Radio Access (E-UTRA); Radio Resource Control (RRC); Protocol specification", (Release 11), LTE Advanced, 3GPP TS 36.331 v11.5.0, (Sep. 2013), 347 pages.

Email discussion on MBMS value range [67b#14], Huawei, 3GPP TSG-RAN WG2 Meeting #68, R2-096531 , Agenda Item: 6.3.2, (Nov. 9-13, 2009), 13 pages.

"Introducing provisions for late corrections", Samsung, 3GPP TSG-RAN2#69 meeting, R2-101853, Agenda Item: 6.8.2.1, (Feb. 22-26, 2010), 32 pages.

"Issues of MBMS service provision under CA", Alcatel-Lucent Shanghai Bell, 3GPP TSG-RAN WG2 Meeting #73bis, Agenda Item 7.3, R2-112229, (Apr. 11-15, 2011), 4 pages.

"Configuration of subframes for monitoring EPDCCH", Alcatel-Lucent, Alcatel-Lucent Shanghai Bell, 3GPP TSG-RAN WG1 Meeting #70bis, R1-124420, Agenda Item 7.5.4, (Oct. 8-12, 2012), 3 pages.

"Cell reselection prioritization for MBMS service continuity", Alcatel-Lucent, Alcatel-Lucent Shanghai Bell, 3GPP TSG-RAN WG2 Meeting #75, R2-114279, Agenda Item 7.3.1.2, (Aug. 22-26, 2011), 3 pages.

"ePDCCH and PMCH", NEC Group, 3GPP TSG-RAN WG1 #70, R1-123254, Agenda Item 7.6.8, (Aug. 13-17, 2012), 3 pages.

"(Re)Selecting appropriate frequency/cell for service continuity", Huawei, Hisilicon, 3GPP TSG-RAN WG2 Meeting #74, R2-113187, Agenda Item 7.3.2, (May 9-13, 2011, 7 pages.

\* cited by examiner

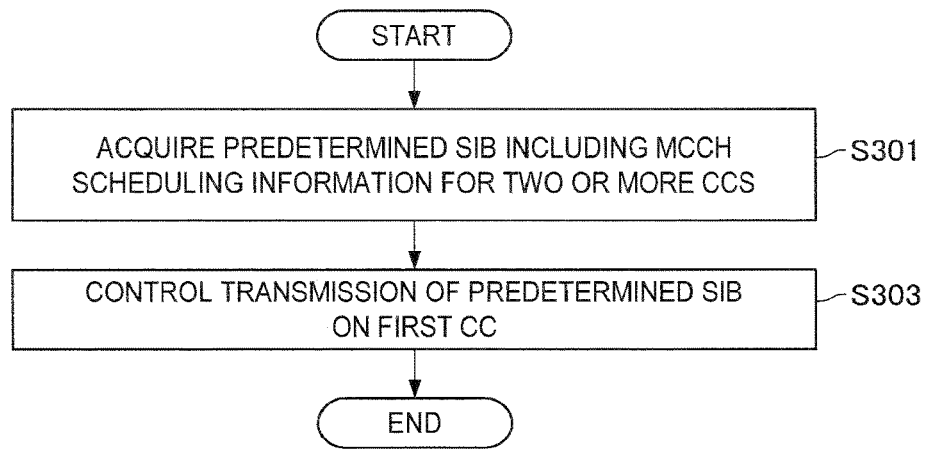
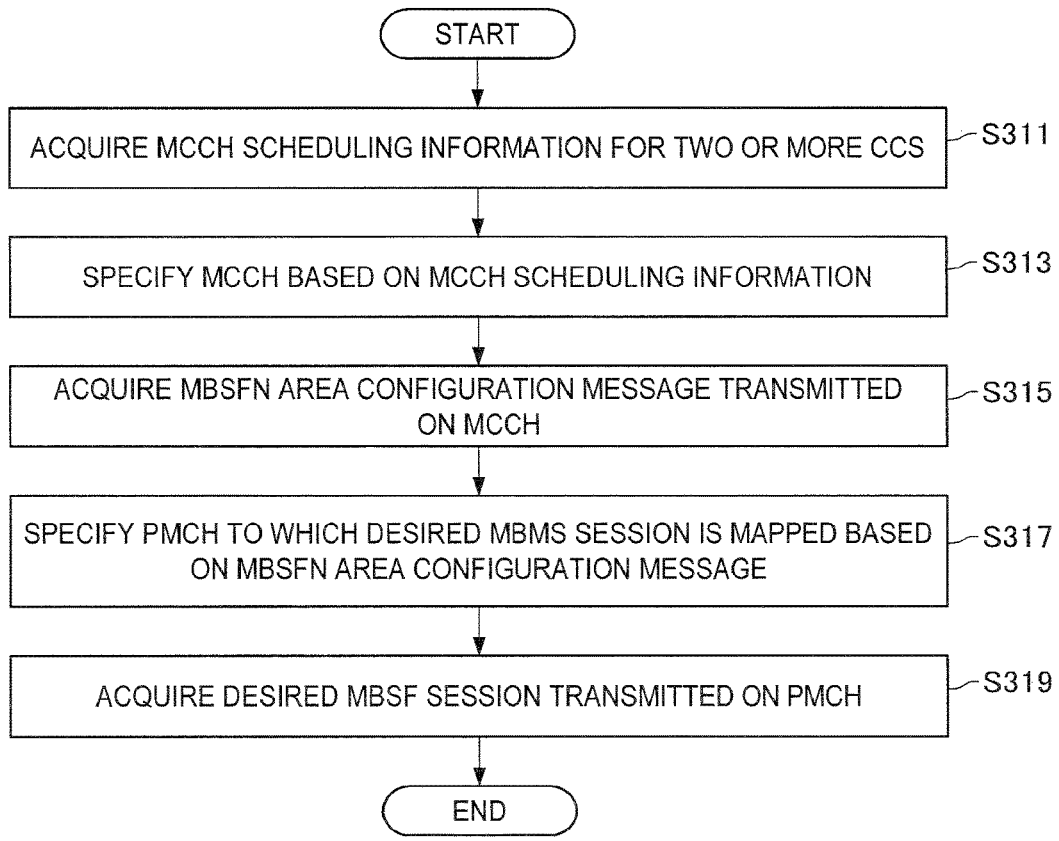

APPARATUS AND METHOD FOR SCHEDULING A PLURALITY OF COMPONENT CARRIERS

TECHNICAL FIELD

The present disclosure relates to an apparatus and a method.

BACKGROUND ART

The multimedia broadcast multicast service (MBMS) has been standardized in the 3rd generation partnership project (3GPP). The MBMS allows broadcast services or multicast services to be provided for terminal device devices in a mobile communication network. Various technologies have been developed with respect to the MBMS.

For example, Non-Patent Literature 1 discloses control information allowing reception and acquisition of data to be broadcast or multicast in the MBMS (MBMS session).

CITATION LIST

Non-Patent Literature

Non-Patent Literature 1: 3 GPP TS 36.331 V11.5.0 (2013-09) LTE; Evolved Universal Terrestrial Radio Access (E-UTRA); Radio Resource Control (RRC); Protocol Specification

SUMMARY OF INVENTION

Technical Problem

However, in the technology disclosed in Non-Patent Literature 1, a load related to MBMS for a terminal device supporting carrier aggregation may increase. More specifically, for example, in the technology disclosed in Non-Patent Literature 1, the control information enabling the reception and acquisition of data to be broadcast or multicast in the MBMS is transmitted using each component carrier. Thus, the terminal device, when using a plurality of component carriers, acquires the control information transmitted using each of the plurality of component carriers. In addition, the terminal device acquires the control information each time the component carrier to be used is changed. In this way, a load on the terminal device may increase.

Thus, it is desirable to provide a mechanism that makes it possible to reduce the load related to MBMS for the terminal device supporting carrier aggregation.

Solution to Problem

According to the present disclosure, there is provided an apparatus including: an acquisition unit configured to acquire specific information used to specify a physical multicast channel (PMCH) of two or more component carriers including a first component carrier; and a control unit configured to control transmission of the specific information on the first component carrier.

According to the present disclosure, there is provided a method including: acquiring specific information used to specify a PMCH of two or more component carriers including a first component carrier; and controlling transmission of the specific information on the first component carrier by a processor.

According to the present disclosure, there is provided an apparatus including: an acquisition unit configured to acquire specific information transmitted on a first component carrier by a base station, the specific information being used to specify a PMCH of two or more component carriers including the first component carrier; and a control unit configured to specify a PMCH of a component carrier included in the two or more component carriers based on the specific information.

Advantageous Effects of Invention

According to the present disclosure as described above, it is possible to reduce the load related to MBMS for the terminal device supporting carrier aggregation. Note that, the above-described advantageous effects are not necessarily limited thereto, but any of the effects described herein or other effects that can be understood from the present disclosure may be achieved in combination with or instead of the above-described effects.

BRIEF DESCRIPTION OF DRAWINGS

FIG. 16 is a flowchart illustrating schematically an exemplary procedure of a communication control process by a base station according to the first embodiment.

FIG. 17 is a flowchart illustrating schematically an exemplary procedure of a communication control process by the terminal device according to the first embodiment.

DESCRIPTION OF EMBODIMENTS

Figure 1:
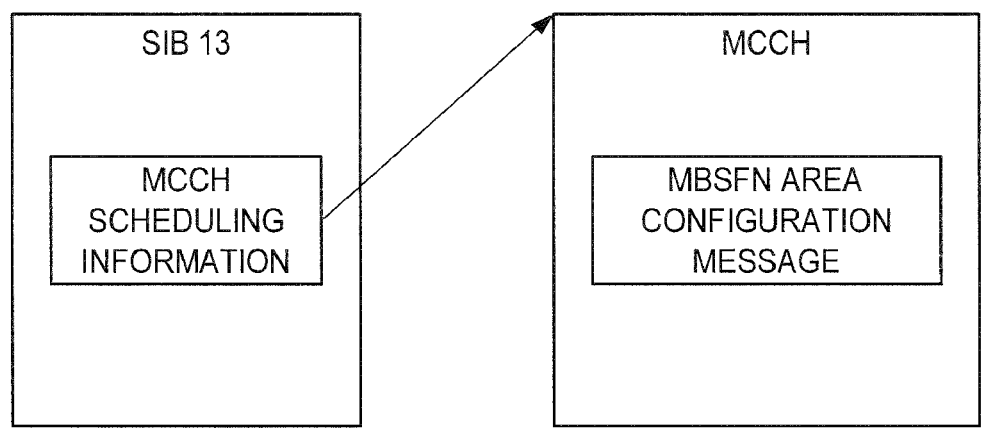
FIG. 1 is a diagram illustrated to describe an example of the technique for specifying a MCCH.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be given in the following order.
1. Introduction
2. Schematic Configuration of Communication System
3. First Embodiment
3.1. Configuration of Base Station
3.2. Configuration of Terminal Device
3.3. Processing Procedure
3.4. Modification
4. Second Embodiment
4.1. Configuration of Base Station
4.2. Configuration of Terminal Device
4.3. Processing Procedure
4.4. First Modification
4.5. Second Modification
5. Application Example
5.1. Application Example regarding Base Station
5.2. Application Example regarding Terminal Device
6. Conclusion

1. INTRODUCTION

General description regarding MBMS and consideration of MBMS in the case where carrier aggregation is supported will be first described with reference to FIGS. 1 to 6.

(General Description Regarding MBMS)

MBMS Session

One program to be broadcast or multicast is referred to as MBMS session. The MBMS session is mapped to a physical multicast channel (PMCH) that is a physical channel for the MBMS.

MBSFN

The MBMS over a single frequency network (MBSFN) service area is a region where one MBMS service is provided. In addition, MBMSFN service area is a region that constitutes a single frequency network (SFN). Up to eight MBSFN service areas may be set in one evolved Node B (eNB).

The SFN is the technology in which a plurality of eNBs transmit the same downlink signal at the same time and at the same frequency and UE synthesizes these downlink signals by regarding the downlink signals from the plurality of eNBs as reflected waves. This improves the signal strength. In the case of broadcasting, the reception is necessary to be performed for widely dispersed terminal devices, and thus such SFN is used.

Channel

Two logical channels, a multicast transport channel (MTCH) and a multicast control channel (MCCH) are provided for the MBMS. In addition, the physical channel called a physical multicast channel (PMCH) is provided for the MBMS. Both the MTCH and MCCH are mapped to the PMCH via a multicast channel (MCT) serving as a transport channel.

In the PMCH, a long cyclic prefix (CP) called Extended CP is transmitted. This is intended to configure the SFN. In other words, this allows a terminal device to synthesize downlink signals from multiple eNBs.

A subframe for the MBSFN includes a physical downlink control channel (PDCCH) portion and a physical downlink shared channel (PDSCH) portion. The PDCCH portion in the subframe is used to convey uplink-scheduling information of a normal subframe, not used for MBMS. On the other hand, the PDSCH portion in the subframe is used for MBMS. In other words, the PDSCH portion in the subframe becomes the PMCH.

In the PMCH, both the MCCH and MTCH are transmitted, and multicast channel (MCH) scheduling information (MSI: MCH scheduling information) generated as media access control (MAC) signaling is also transmitted. The MSI is information indicating which of subframes in the PMCH is mapped to each MBMS session (or each MTCH). The MSI is transmitted in the first subframe of PMCH.

MBMS Scheduling

The UE can receive a desired program (MBMS session) only if a radio resource to be used for transmission of the desired program is specified. Thus, the UE specifies the radio resource based on the information provided from the eNB. A technique for specifying the radio resource will be described with reference to FIGS. 1 to 3.

FIG. 1 is a diagram illustrated to describe an example of the technique for specifying an MCCH. Referring to FIG. 1, a system information block (SIB) 13 includes MCCH scheduling information. Specifically, the MCCH scheduling information includes an MCCH offset and an MCCH repetition period. A radio frame in which an MCCH is located is specified from these pieces of information. In addition, the MCCH scheduling information contains subframe allocation information. From this information, a subframe in which MCCH is located is specified. In this way, the MCCH is specified from the MCCH scheduling information included in the SIB 13.

Figure 2:
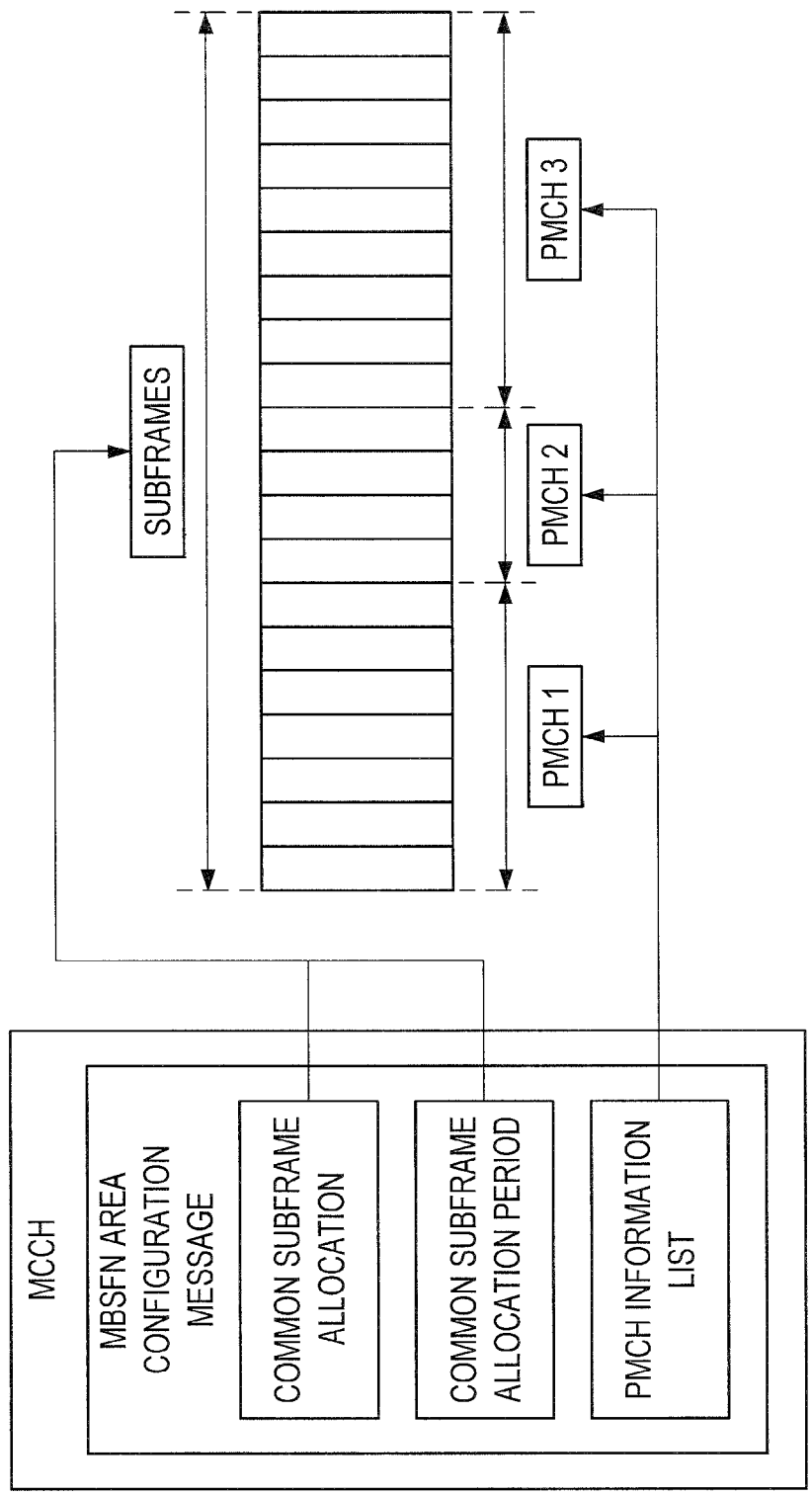
FIG. 2 is a diagram illustrated to describe an example of the technique for specifying a PMCH.

FIG. 2 is a diagram illustrated to describe an example of the technique for specifying a PMCH. Referring to FIG. 2, in the MCCH, an MBSFN area configuration message is transmitted. The MBSFN area configuration message includes common subframe allocation, a common subframe allocation period, and a PMCH information list. The common subframe allocation indicates a subframe for the MBSFN. In addition, the common subframe allocation period indicates a period of time at which a subframe indicated by the common subframe allocation is allocated to the PMCH. In other words, subframes (e.g., 20 subframes) to be allocated to the PMCH are specified from the common subframe allocation and the common subframe allocation period. Furthermore, the PMCH information list indicates a subframe to be allocated to each PMCH (e.g., each of PMCHs 1 to 3). The subframe is allocated to up to 16 PMCHs. In addition, the PMCH information list further indicates the MTCH and the MBMS session that are mapped to each PMCH. Up to 30 MBMS sessions are mapped to up to 16 PMCHs. In one example, MBMS sessions 1 to 4 are mapped to PMCH 1. MBMS sessions 5 and 6 may be mapped to PMCH 2. Thus, the PMCH, and the MTCH and MBMS session mapped to the PMCH are specified from the MBSFN area configuration message transmitted on the MCCH. The common subframe allocation in the MBSFN area configuration message may be substituted by MBSFN subframe configuration included in SIB 2.

Figure 3:
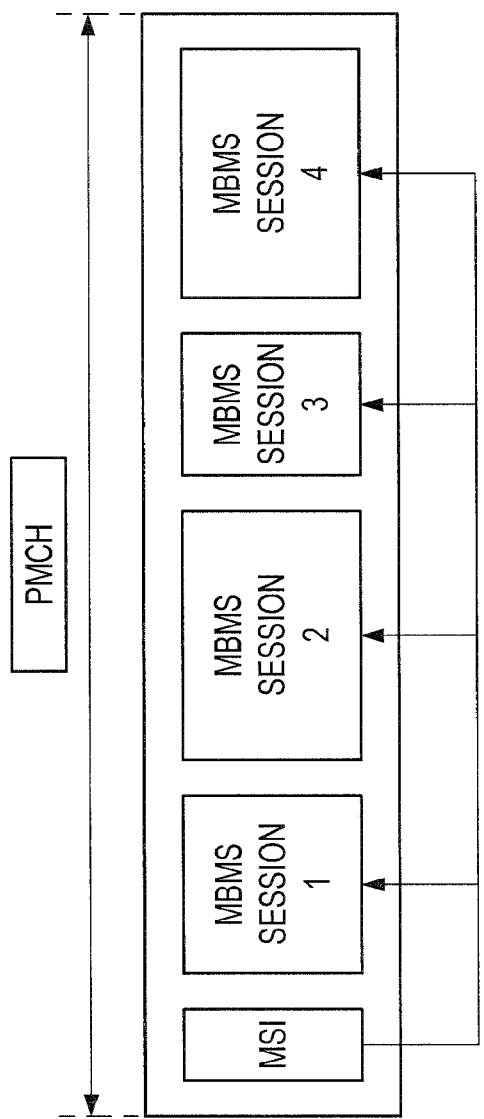
FIG. 3 is a diagram illustrated to describe an example of the technique for specifying a radio resource allocated to each MBMS session.

FIG. 3 is a diagram illustrated to describe an example of the technique for specifying the radio resource allocated to each MBMS session. Referring to FIG. 3, the PMCH includes MSI in a subframe at the head of the PMCH. The MSI indicates a radio resource (e.g., subframe) to which each of the MBMS sessions (e.g., MBMS sessions 1 to 4) is mapped. Thus, the radio resource allocated to each MBMS session is specified from the MSI transmitted through the PMCH.

Target UE of MBMS

The MBMS is provided for not only a UE in the radio resource control (RRC) connected mode but also a UE in the RRC idle mode. In other words, both the UE in the RRC connected mode and the UE in the RRC idle mode can receive and acquire MBMS sessions.

Modulation and Coding Scheme

The modulation and coding scheme (MCS) can be changed by a multimedia broadcast multicast coordination entity (MCE). However, the MCS is not changed frequently in broadcasting. Thus, in one example, a hard-coded MCS is used.

Feedback Information

In MBMS for LTE, there is no feedback information from the UE. Although there is a mixed mode in which both normal communication and MBMS are performed, feedback information regarding MBMS is not determined on the standard even in the mixed mode.

(Consideration of MBMS in Case when Carrier Aggregation is Supported)

Use Case

In the case where the carrier aggregation is supported, a plurality of component carriers (CCs) may be used. For example, an eNB in a small cell can use a plurality of CCs. For the transmission of MBMS session when a plurality of CCs are used, several use cases are considered. Such use cases will be described below with reference to FIGS. 4 to 6.

Figure 4:
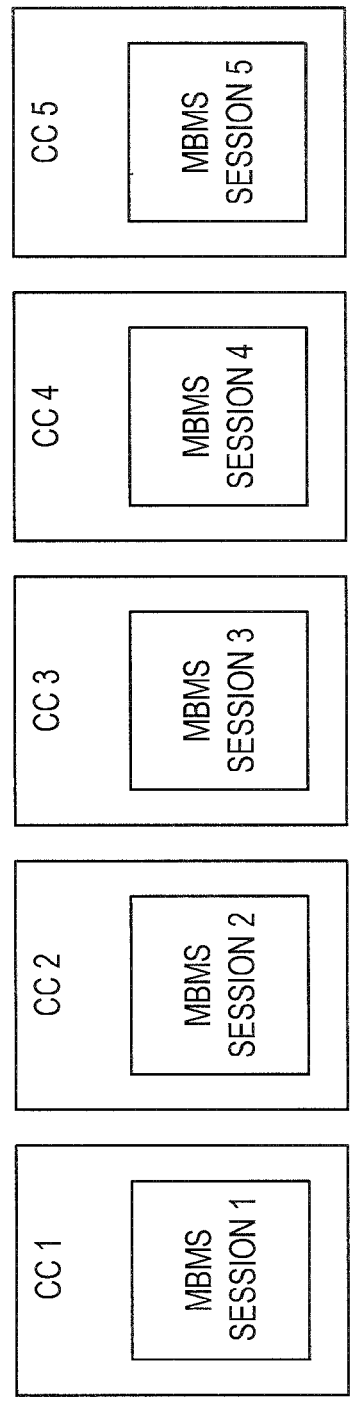
FIG. 4 is a diagram illustrated to describe an example of a first use case for MBMS sessions.

FIG. 4 is a diagram illustrated to describe an example of a first use case for an MBMS session. Referring to FIG. 4, in one example, five CCs, i.e. CC 1 to CC 5 are used, and the MBMS sessions are transmitted on each respective component carrier of CC 1 to CC 5. For example, MBMS session 1 is transmitted on CC 1, and MBMS session 4 is transmitted on CC 4. For example, as described above, MBMS sessions are transmitted on each respective CC. In such a case, for example, the UE receives MCCH scheduling information, an MBSFN area configuration message, MSI, and other information on different CCs for receiving different MBMS sessions.

Figure 5:
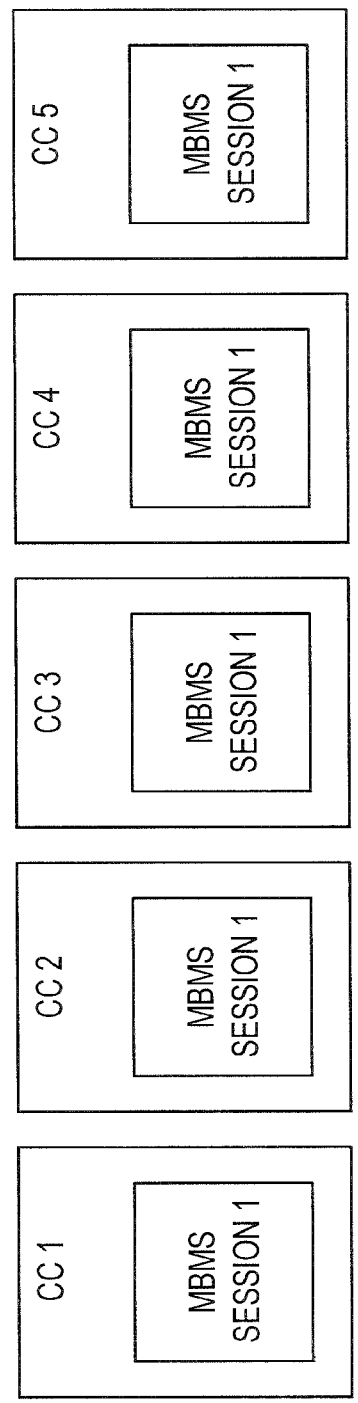
FIG. 5 is a diagram illustrated to describe an example of a second use case for MBMS sessions.

FIG. 5 is a diagram illustrated to describe an example of a second use case for an MBMS session. Referring to FIG. 5, in one example, five CCs, i.e. CC 1 to CC 5 are used, and the same MBMS session is transmitted on each respective component carrier of CC 1 to CC 5. In other words, MBMS session 1 is transmitted on all of CC 1 to CC 5. For example, as described above, the same MBMS session is transmitted on each respective CC. Accordingly, even if CC used by UE changes with a change in the communication quality, the UE can receive the same MBMS session without interruption. In such a case, for example, when a CC used by the UE is changed, the UE receives MCCH scheduling information, an MBSFN area configuration message, MSI, and other information on a new CC for receiving the same MBMS session.

Figure 6:
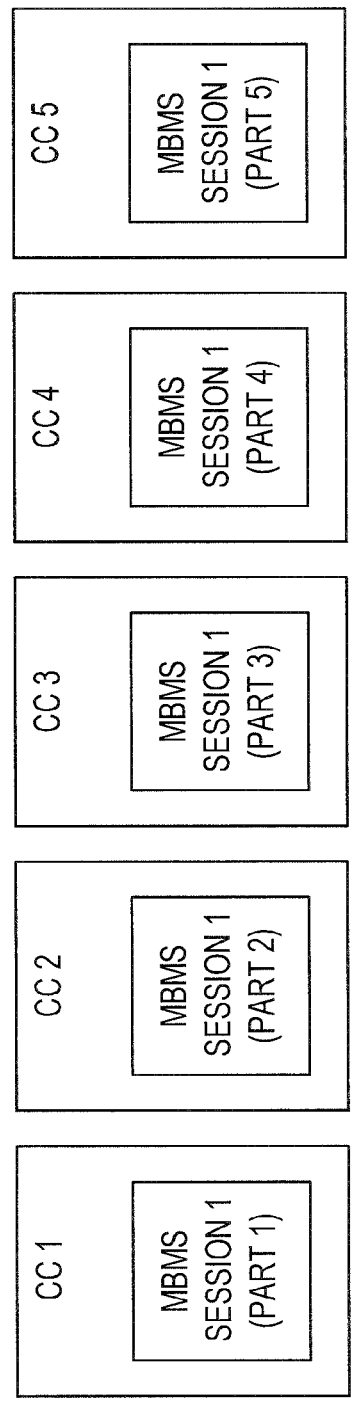
FIG. 6 is a diagram illustrated to describe an example of a third use case for MBMS sessions.

FIG. 6 is a diagram illustrated to describe an example of a third use case for an MBMS session. Referring to FIG. 6, in one example, five CCs, i.e. CC 1 to CC 5 are used, and individual parts of the same MBMS session are transmitted on the respective component carriers, CC 1 to CC 5. For example, MBMS session 1 includes parts 1 to 5. The part 1 of the MBMS session 1 is transmitted on the CC 1, and the part 4 of the MBMS session 1 is transmitted on the CC 4. For example, as described above, individual parts of the same MBMS session are transmitted on the respective CCs. Thus, for example, the UE can receive an MBMS session with large data size. In such a case, the UE receives MCCH scheduling information, an MBSFN area configuration message, MSI, and other information on the respective CCs for receiving individual parts of the MBMS session.

UE Operation for Each CC

An example of the operation of UE for each CC will be described.

(1) UE achieves the frequency synchronization and time synchronization with CC.

(2) The UE acquires SIB 2 transmitted on CC. The SIB 2 includes MBSFN subframe configuration that indicates a subframe for MBSFN. The UE specifies the subframe for MBSFN from the SIB 2. This allows the UE to recognize that a cyclic prefix (CP) for MBSFN is used in the PDSCH portion of the subframe for MBSFN.

(3) The UE acquires SIB 13 transmitted on CC. Then, the UE specifies an MCCH from the MCCH scheduling information included in the SIB 13. In other words, the UE specifies a radio frame and subframe in which the MCCH is located.

(4) The UE acquires the MBSFN area configuration message transmitted on the MCCH.

(5) The UE specifies the subframe for MBSFN from the common subframe allocation and common subframe allocation period included in the MBSFN area configuration message. The subframe for MBSFN may be specified from the SIB 2 in the above item (2).

(6) The UE specifies a PMCH to which a desired MBMS session is mapped from the PMCH information list included in the MBSFN area configuration message. In other words, the UE specifies a subframe to be allocated to the PMCH to which a desired MBMS session is mapped.

(7) The UE specifies a radio resource (subframe) to which the desired MBMS is mapped, from the MST transmitted on the PMCH to which the desired MBMS session is mapped.

(8) The UE receives and acquires the desired MBMS session through the specified radio resource (subframe).

The operations of items (1) to (8) as described above are performed for each CC.

2. SCHEMATIC CONFIGURATION OF COMMUNICATION SYSTEM

Figure 7:
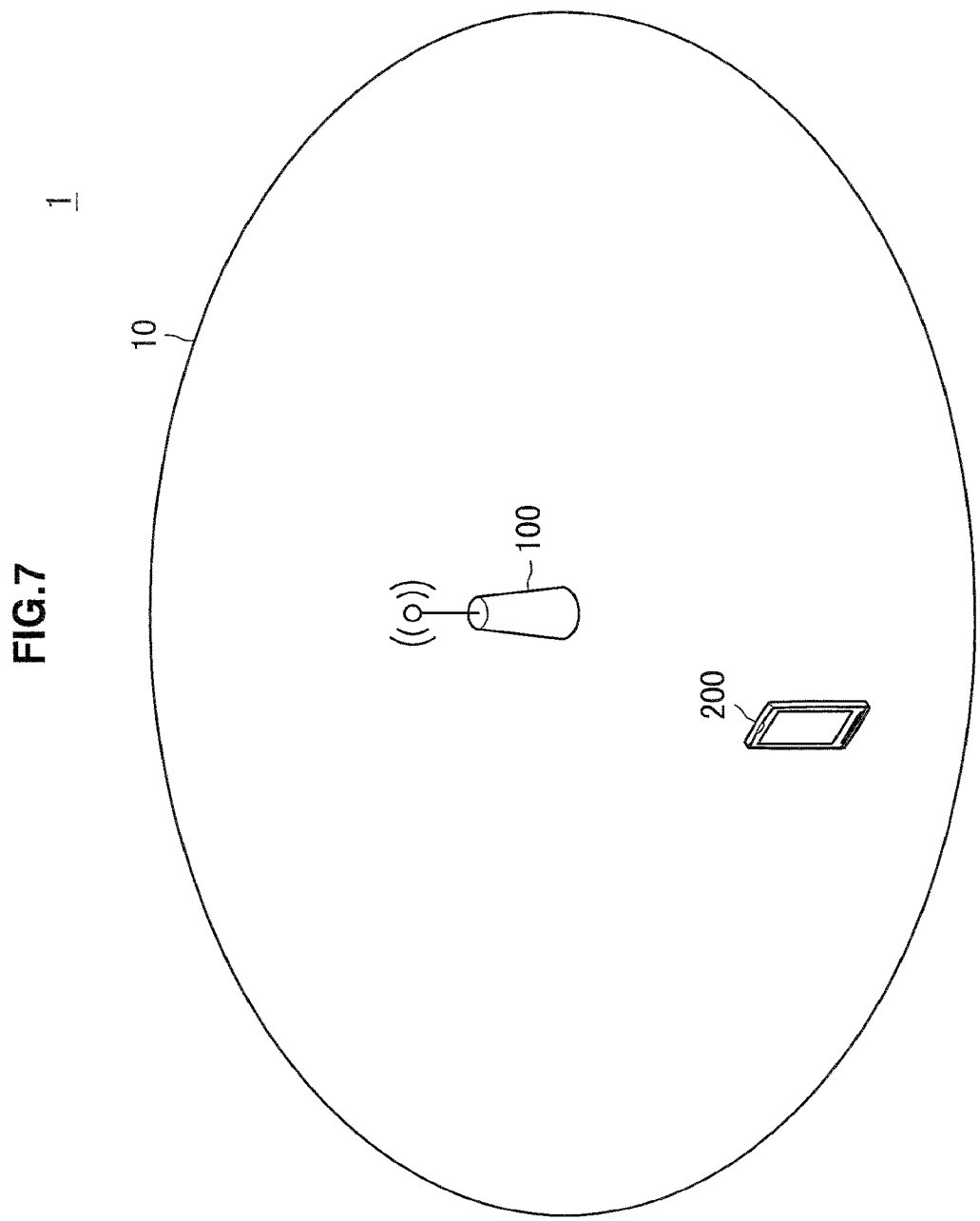
FIG. 7 is a diagram illustrated to describe an example of the schematic configuration of a communication system according to an embodiment of the present disclosure.

Subsequently, the schematic configuration of a communication system 1 according to an embodiment of the present disclosure will be described with reference to FIG. 7. FIG. 7 is a diagram illustrated to describe an example of the schematic configuration of the communication system 1 according to the present embodiment. Referring to FIG. 7, the communication system 1 is configured to include a base station 100 and a terminal device 200. For example, the communication system 1 is a system according to LTE, LTE-Advanced, and other communication standards equivalent thereto.

The base station 100 communicates wirelessly with the terminal device 200 located within a cell 10. In addition, the base station 100 supports the carrier aggregation. In other words, the base station 100 can use a plurality of component carriers (CCs) simultaneously to communicate wirelessly with one terminal device 200.

The terminal device 200, when entering the area covered by the cell 10, communicates wirelessly with the base station 100. In addition, the terminal device 200 supports the carrier aggregation, and thus can use a plurality of CCs simultaneously to communicate wirelessly with the base station 100.

Although FIG. 7 illustrates only one base station 100 and one terminal device 200, it will be understood that the communication system 1 may be configured to include two or more base stations 100 and/or two or more terminal devices 200.

3. FIRST EMBODIMENT

Subsequently, a first embodiment of the present disclosure will be described with reference to FIGS. 8 to 18.

In the embodiment of the present disclosure, the base station 100 transmits specific information on a first CC. The specific information is used to specify a PMCH of two or more CCs including the first CC. Particularly, in the first embodiment, the specific information is MCCH scheduling information for the two or more CCs. In other words, the base station 100 transmits the MCCH scheduling information for the two or more CCs on the first CC included in the two or more CCs. This makes it possible to reduce, for example, the load on the MBMS for the terminal device 200.

<3.1. Configuration of Base Station>

Figure 8:
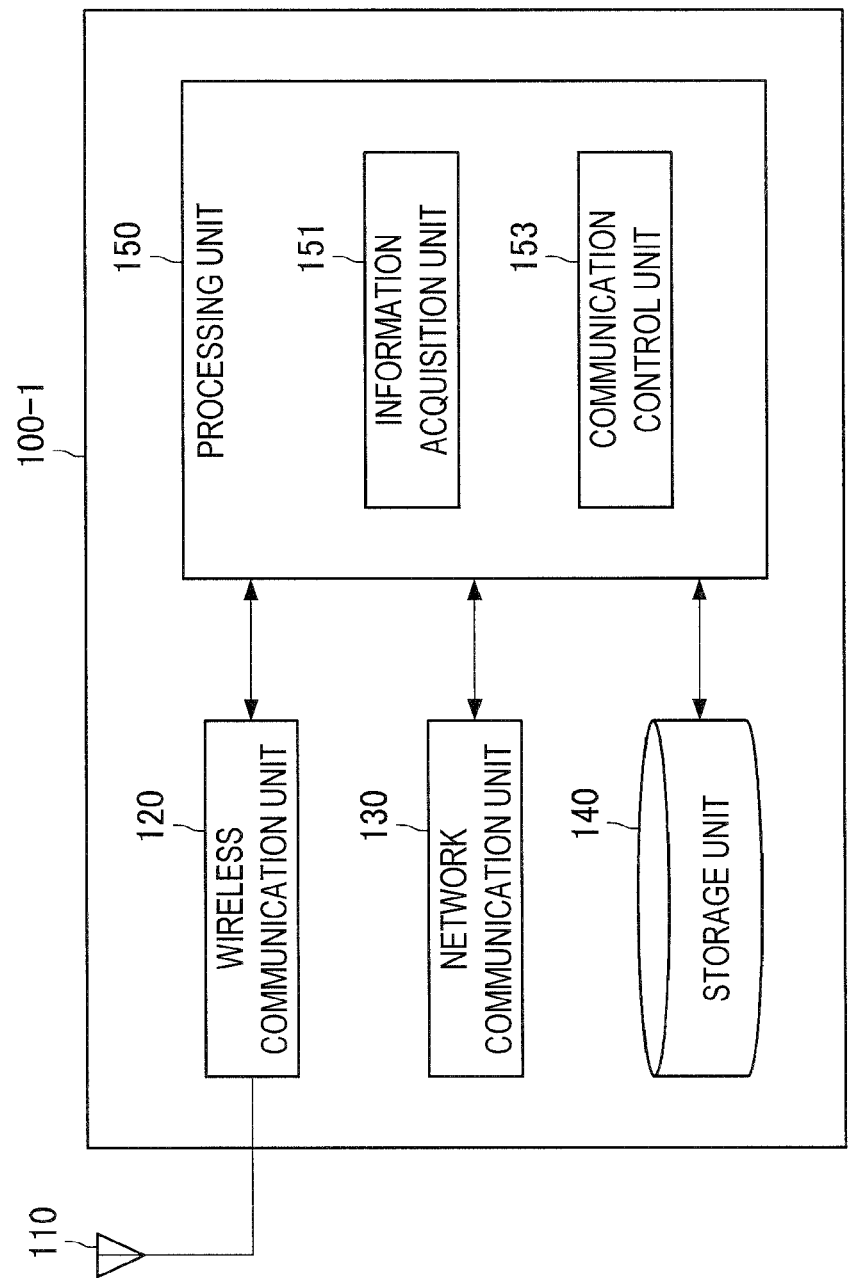
FIG. 8 is a block diagram illustrating an exemplary configuration of a base station according to the first embodiment.

The exemplary configuration of a base station 100-1 according to the first embodiment will be first described with reference to FIGS. 8 to 14. FIG. 8 is a block diagram illustrating an exemplary configuration of the base station 100-1 according to the first embodiment. Referring to FIG. 8, the base station 100-1 is configured to include an antenna unit 110, a wireless communication unit 120, a network communication unit 130, a storage unit 140, and a processing unit 150.

(Antenna Unit 110)

The antenna unit 110 radiates signals, which are outputted by the wireless communication unit 120, into space as radio waves. In addition, the antenna unit 110 converts the radio waves coming from space into signals and outputs the signals to the wireless communication unit 120.

(Wireless Communication Unit 120)

The wireless communication unit 120 performs wireless communication. In one example, the wireless communication unit 120 transmits a downlink signal to a terminal device 200-1 located within the cell 10, and receives an uplink signal from the terminal device 200-1 located within the cell 10. In addition, the wireless communication unit 120 performs wireless communication on each of a plurality of CCs.

(Network Communication Unit 130)

The network communication unit 130 communicates with other nodes. In one example, the network communication unit 130 communicates with other base stations. In addition, the network communication unit 130 communicates with a core network node (e.g., serving gateway (S-GW) and mobility management entity (MME)).

(Storage Unit 140)

The storage unit 140 stores a program and data used to operate the base station 100-1 in a temporary or permanent manner.

(Processing Unit 150)

The processing unit 150 implements various functions of the base station 100-1. The processing unit 150 is configured to include an information acquisition unit 151 and a communication control unit 153.

(Information Acquisition Unit 151)

The information acquisition unit 151 acquires specific information used to specify a PMCH of two or more CCs including the first CC.

Particularly, in the first embodiment, the specific information is the scheduling information of MCCH (hereinafter referred to as "MCCH scheduling information") for the two or more CCs. In other words, the information acquisition unit 151 acquires the MCCH scheduling information for the two or more CCs. The MCCH scheduling information is, for example, information indicating a radio frame and subframe where the MCCH is located.

System Information Block (SIB)

In one example, the information acquisition unit 151 acquires a predetermined system information block (SIB) that includes the MCCH scheduling information for the two or more CCs. The predetermined SIB is, for example, an SIB for the first CC. In addition, the predetermined SIB is, for example, an SIB 13 (also called SIB type 13).

Individual MCCH Scheduling Information

The MCCH scheduling information for the two or more CCs contains one or more pieces of individual MCCH scheduling information. In addition, each of the one or more pieces of individual MCCH scheduling information is MCCH scheduling information for at least one CC of the two or more CCs.

Further, for example, the predetermined SIB includes the one or more pieces of individual MCCH scheduling information and identification information for a CC that corresponds to each of the one or more pieces of individual MCCH scheduling information. The identification information is, for example, the cell identity (ID). For example, this allows the terminal device 200-1 to identify which of CCs is corresponded to the individual MCCH scheduling information within the predetermined SIB.

Individual MCCH Scheduling Information for Each CC

For example, the MCCH scheduling information contains individual MCCH scheduling information for each of the two or more CCs. In other words, the information acquisition unit 151 acquires the predetermined SIB that includes individual MCCH scheduling information for each of the two or more CCs. The detailed description will be given below on this point with reference to FIG. 9.

Figure 9:
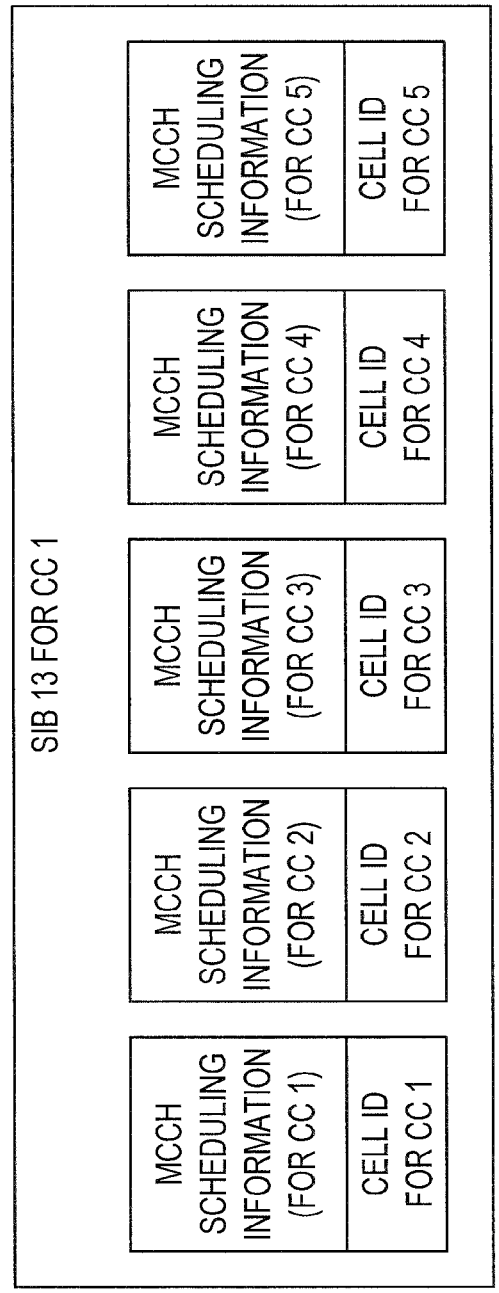
FIG. 9 is a diagram illustrated to describe a first example of the SIB 13 including MCCH scheduling information for two or more CCs.

FIG. 9 is a diagram illustrated to describe a first example of SIB 13 that includes the MCCH scheduling information for two or more CCs. Referring to FIG. 9, the SIB 13 for CC1 is illustrated. In this example, the base station 100-1 uses CC 1 to CC 5, and the SIB 13 includes individual MCCH scheduling information for each of the CC 1 to CC 5. In addition, the SIB 13 includes a cell ID of the CC corresponding to each of five pieces of individual MCCH scheduling information. The cell ID of CC is associated with the individual MCCH scheduling information for the CC. In other words, the cell ID of the CC 1 is associated with the individual MCCH scheduling information for the CC 1. In addition, the cell ID of the CC 3 is associated with the individual MCCH scheduling information for the CC 3.

Thus, for example, it is possible to perform scheduling of MCCH for each CC.

The predetermined SIB (e.g., SIB 13) is not necessary to include the MCCH scheduling information for all the CCs (e.g., CC 1 to CC 5) used by the base station 100-1, but may include the MCCH scheduling information for some of the CCs. In other words, the two or more CCs are not necessary to be all the CCs (e.g., CC 1 to CC 5), but may be some of them. In addition, some of the CCs may be different depending on the type of CCs on which the MCCH scheduling information is transmitted. The detailed description will be given below on this point with reference to FIG. 10.

Figure 10:
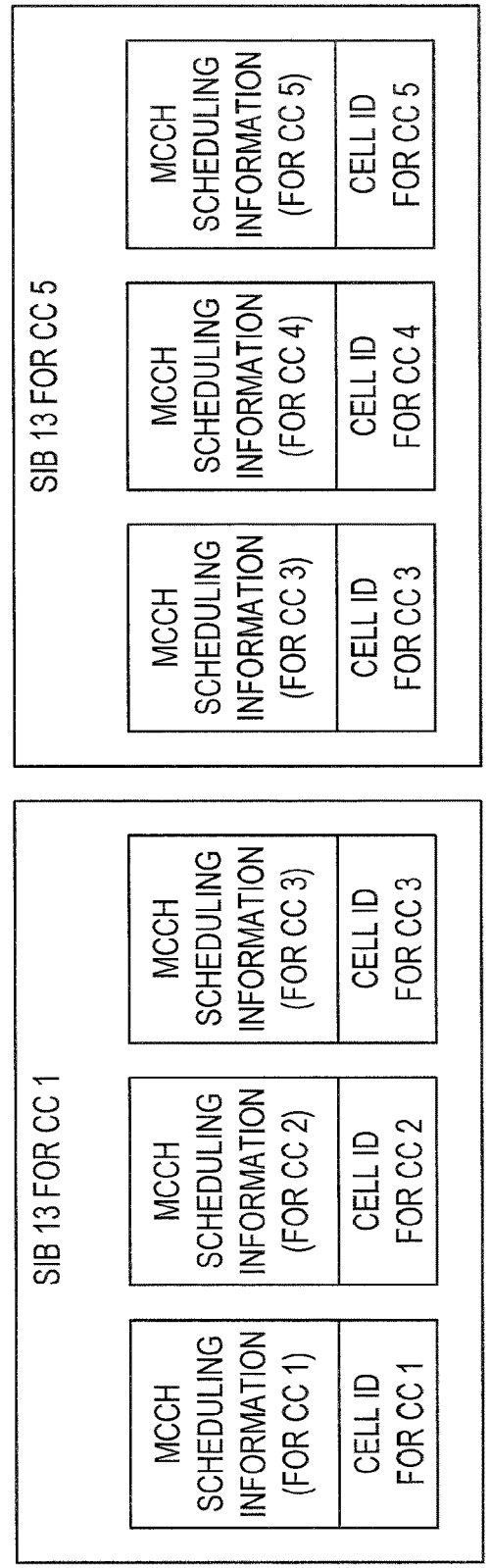
FIG. 10 is a diagram illustrated to describe a second example of the SIB 13 including MCCH scheduling information for two or more CCs.

FIG. 10 is a diagram illustrated to describe a second example of the SIB 13 that includes the MCCH scheduling information for two or more CCs. Referring to FIG. 10, the SIB 13 for CC 1 and the SIB 13 for CC 5 are illustrated. In this example, the base station 100-1 uses the CC 1 to CC 5, and the SIB 13 for CC 1 includes the individual MCCH scheduling information for each of the CC 1 to CC 3. In addition, the SIB 13 for CC 5 includes the individual MCCH scheduling information for each of the CC 3 to CC 5. In this way, the MCCH scheduling information for all the CCs used by the base station 100-1 is not necessarily included in the SIB 13 for each CC (i.e. SIB 13 transmitted on each CC).

Common MCCH Scheduling Information Between CCs

The one or more individual MCCH scheduling information may contain MCCH scheduling information that is common between at least two CCs that are included in the two or more CCs. In other words, the information acquisition unit 151 may acquire the predetermined SIB including the MCCH scheduling information that is common between the at least two CCs. The detailed description will be given below on this point with reference to FIGS. 11 and 12.

Figure 11:
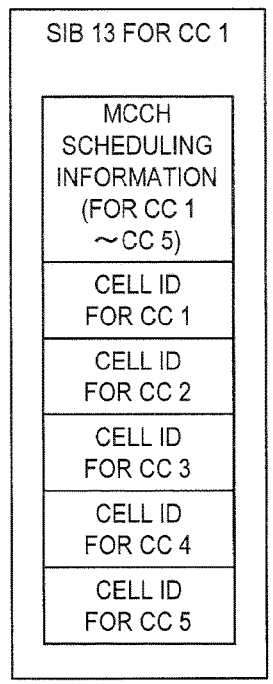
FIG. 11 is a diagram illustrated to describe a third example of the SIB 13 including MCCH scheduling information for two or more CCs.

FIG. 11 is a diagram illustrated to describe a third example of the SIB 13 that includes the MCCH scheduling information for two or more CCs. Referring to FIG. 11, the SIB 13 for CC 1 is illustrated. In this example, the base station 100-1 uses the CC 1 to CC 5, and the scheduling of MCCH is the same among the CC 1 to CC 5. Thus, the SIB 13 includes MCCH scheduling information that is common among the CC 1 to CC 5. In addition, the SIB 13 includes cell IDs of the CC 1 to CC 5 that correspond to the MCCH scheduling information. The cell IDs of the CC 1 to CC 5 are associated with the MCCH scheduling information that is common among the CC 1 to CC 5.

Figure 12:
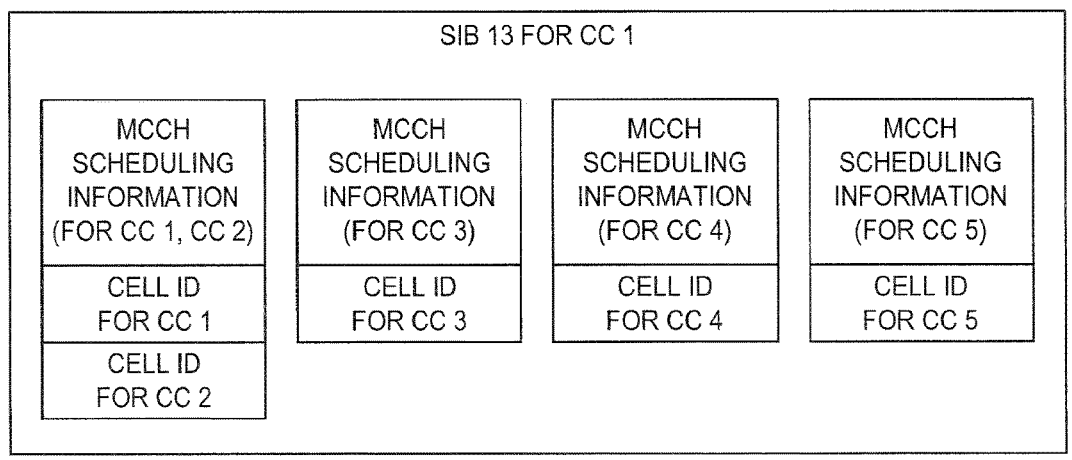
FIG. 12 is a diagram illustrated to describe a fourth example of the SIB 13 including MCCH scheduling information for two or more CCs.

FIG. 12 is a diagram illustrated to describe a fourth example of the SIB 13 that includes the MCCH scheduling information for two or more CCs. Referring to FIG. 12, the SIB 13 for CC 1 is illustrated. In this example, the base station 100-1 uses the CC 1 to CC 5, and the scheduling of MCCH is the same between the CC 1 and CC 2. Thus, the SIB 13 includes MCCH scheduling information that is common between the CC 1 and CC 2. In addition, the SIB 13 includes cell IDs of the CC 1 and CC 2 that correspond to the MCCH scheduling information. The cell IDs of the CC 1 and CC 2 are associated with the MCCH scheduling information that is common between the CC 1 and CC 2.

In this way, the MCCH scheduling information that is common among CCs may be used. Thus, for example, information to be transmitted is reduced. Accordingly, for example, radio resources to be consumed (e.g., radio resource to be used for SIB) can be reduced. In addition, for example, the power consumption of the base station 100-1 can be reduced.

Details of Information included in MCCH Scheduling Information

In one example, the MCCH scheduling information includes an MCCH offset, an MCCH repetition period, and subframe allocation information. Thus, for example, the MCCH is specified. In other words, a radio frame and subframe in which the MCCH is located are specified. The detailed description will be given below on this point with reference to FIGS. 13 and 14.

Figure 13:
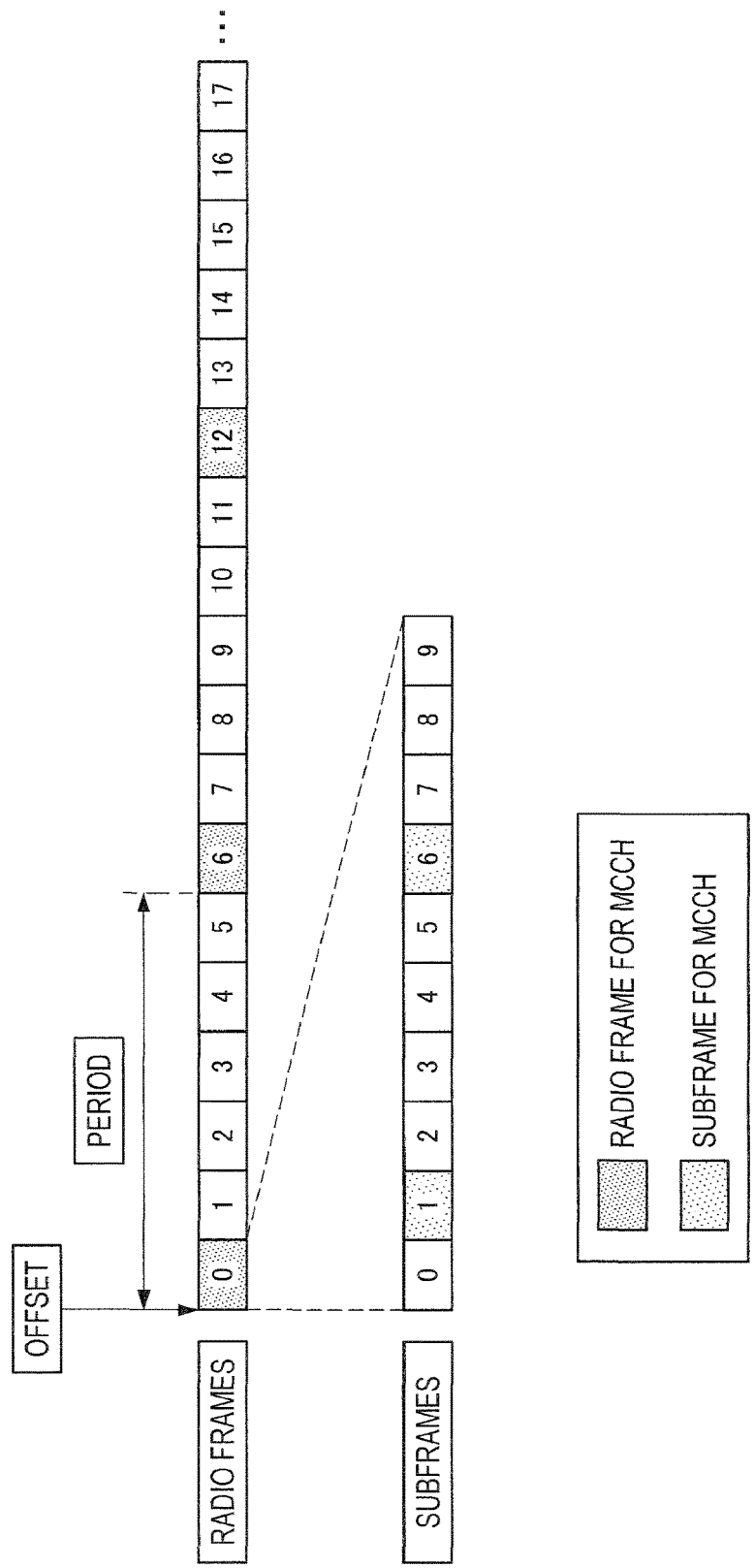
FIG. 13 is a diagram illustrated to describe a first example of the radio frame and subframe in which an MCCH is located.

FIG. 13 is a diagram illustrated to describe a first example of the radio frame and subframe in which an MCCH is located. Referring to FIG. 13, there are illustrated a plurality of radio frames and 10 subframes, which are included in one radio frame of the plurality of radio frames are illustrated. The MCCH repetition period indicates a period of the radio frame in which the MCCH is located, and the MCCH offset indicates the starting point of the period. For example, a radio frame of system frame number (SFN) that satisfies the condition of "SFN mod MCCH repetition period=MCCH offset" becomes the radio frame in which the MCCH is located. In this example, the MCCH repetition period is 6, and the MCCH offset is 0. Thus, the radio frames with the SFN of 0, 6, 12, . . . are the radio frames in which the MCCH is located. In this way, the radio frame in which the MCCH is located is specified from the MCCH repetition period and the MCCH offset. In addition, the subframe allocation information indicates a subframe in which the MCCH is located (in this example, subframes with the subframe numbers of 1 and 6 among 10 subframes included in the radio frame. Thus, the subframe in which the MCCH is located is specified from the subframe allocation information.

Figure 14:
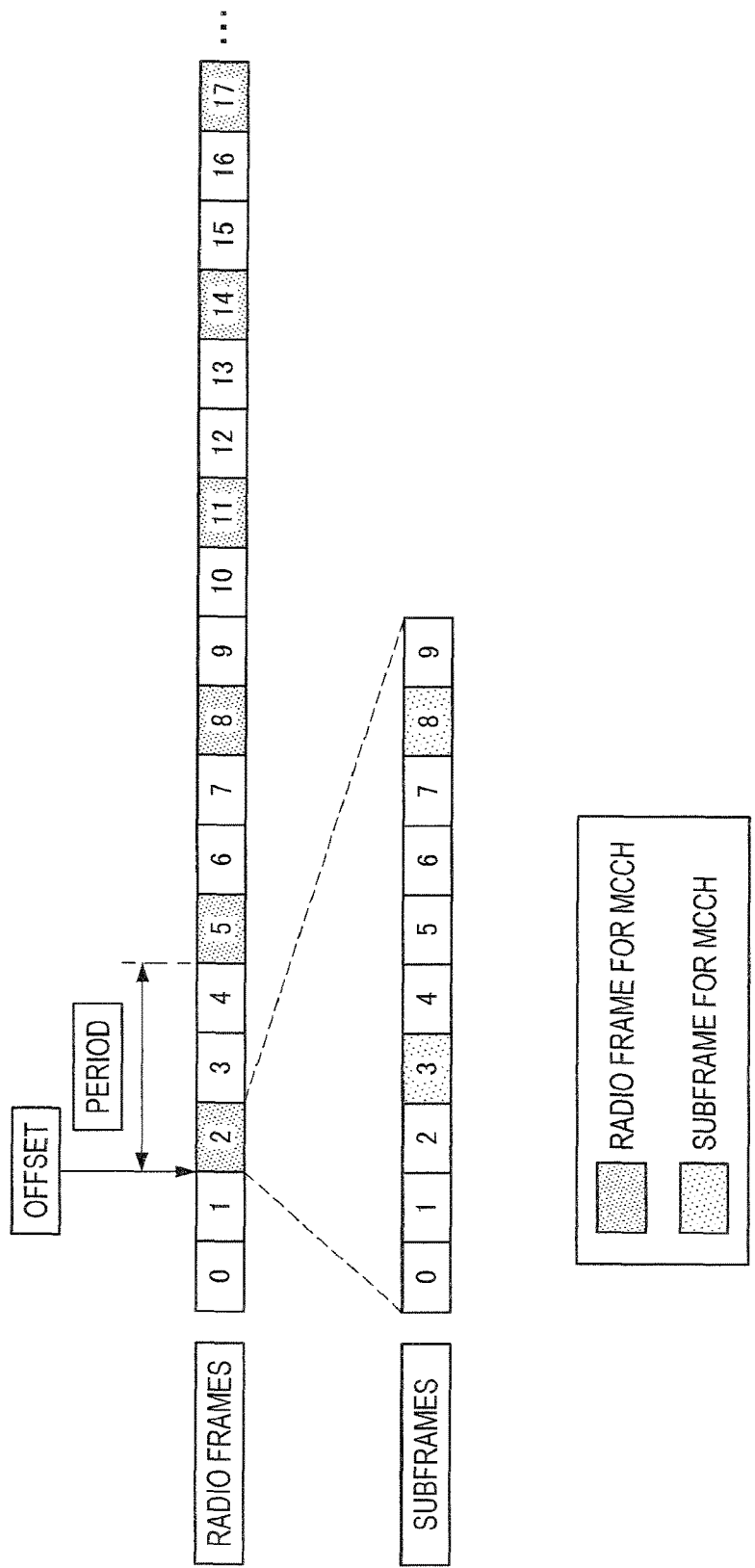
FIG. 14 is a diagram illustrated to describe a second example of the radio frame and subframe in which an MCCH is located.

FIG. 14 is a diagram illustrated to describe a second example of the radio frame and subframe in which the MCCH is located. Referring to FIG. 14, in this example, the MCCH repetition period is 3 and the MCCH offset is 2. Thus, radio frames with the SFNs of 2, 5, 8, 11, 14, 17, . . . are the radio frames in which the MCCH is located. In addition, in this example, the subframe allocation information indicates subframes with the subframe numbers of 3 and 8, and these subframes are subframes in which the MCCH is located. In this way, the radio frame and subframe in which MCCH is located are specified.

The foregoing has described the information acquisition unit 151 particularly based on the first CC (e.g., CC 1). It will be understood that the information acquisition unit 151 can acquire a predetermined SIB (e.g., SIB 13) for a different CC (e.g., any of CC 2 to CC 5). Then, the predetermined SIB can include the MCCH scheduling information for two or more CCs that include the other CC.

(Communication Control Unit 153)

The communication control unit 153 controls the transmission of the specific information on the first CC.

Particularly, in the first embodiment, for example, the communication control unit 153 controls the transmission of the predetermined SIB on the first CC. As described above, the predetermined SIB includes the MCCH scheduling information for the two or more CCs.

Specifically, in one example, the communication control unit 153 controls the transmission by mapping a signal of the predetermined SIB 13 (e.g., SIB 13) to the radio resource scheduled to the SIB 13 of the radio resources of the first CC. This allows the SIB 13 to be transmitted on the first CC. In other words, the MCCH scheduling information for the two or more CC is transmitted on the first CC.

In another example, the communication control unit 153 may control the transmission by triggering the transmission of the predetermined SIB on the first CC to control the transmission. Specifically, the communication control unit 153 may control the transmission by instructing another component in the base station 100-1 (e.g., another component included in the processing unit 150) to transmit the predetermined SIB on the first CC. This may allow the SIB 13 to be transmitted on the first CC.

As described above, the MCCH scheduling information for the two or more CCs including the first CC is transmitted on the first CC. For example, this makes it possible to reduce the load on MBMS for the terminal device 200-1 that supports carrier aggregation. More specifically, for example, the terminal device 200-1, even when using two or more CCs, may be configured not to receive and acquire the MCCH scheduling information on each of the two or more CCs. For example, the MCCH scheduling information for the two or more CCs can be received and acquired using one CC. Thus, it is possible to reduce the load on the terminal device 200-1 to specify the radio resource in which the MCCH is located (i.e. radio frame and subframe).

In one example, even when CCs for receiving MBMS sessions frequently vary with a change in communication quality of the CC, the terminal device 200-1 is not necessary to acquire the MCCH scheduling information each time the CC varies. In another example, even when the same MBMS session is transmitted on each CC as illustrated in FIG. 5 and the terminal device 200-1 receives the MBMS session on the CC having satisfactory communication quality, the terminal device 200-1 is not necessary to acquire the MCCH scheduling information on each CC. In still another example, even when different parts of the same MBMS session are transmitted on each CC as illustrated in FIG. 6 and the terminal device 200-1 receives the different parts on each CC, the terminal device 200-1 is not necessary to acquire the MCCH scheduling information on each CC. Thus, it is possible to reduce the load on the terminal device 200-1.

The foregoing has described the communication control unit 153 particularly based on the first CC (e.g., CC 1). It will be understood that the communication control unit 153 can control the transmission of a predetermined SIB on a different CC (e.g., any of CC 2 to CC 5). In addition, the predetermined SIB can include the MCCH scheduling information for two or more CCs that include the other CC.

<3.2. Configuration of Terminal Device>

Figure 15:
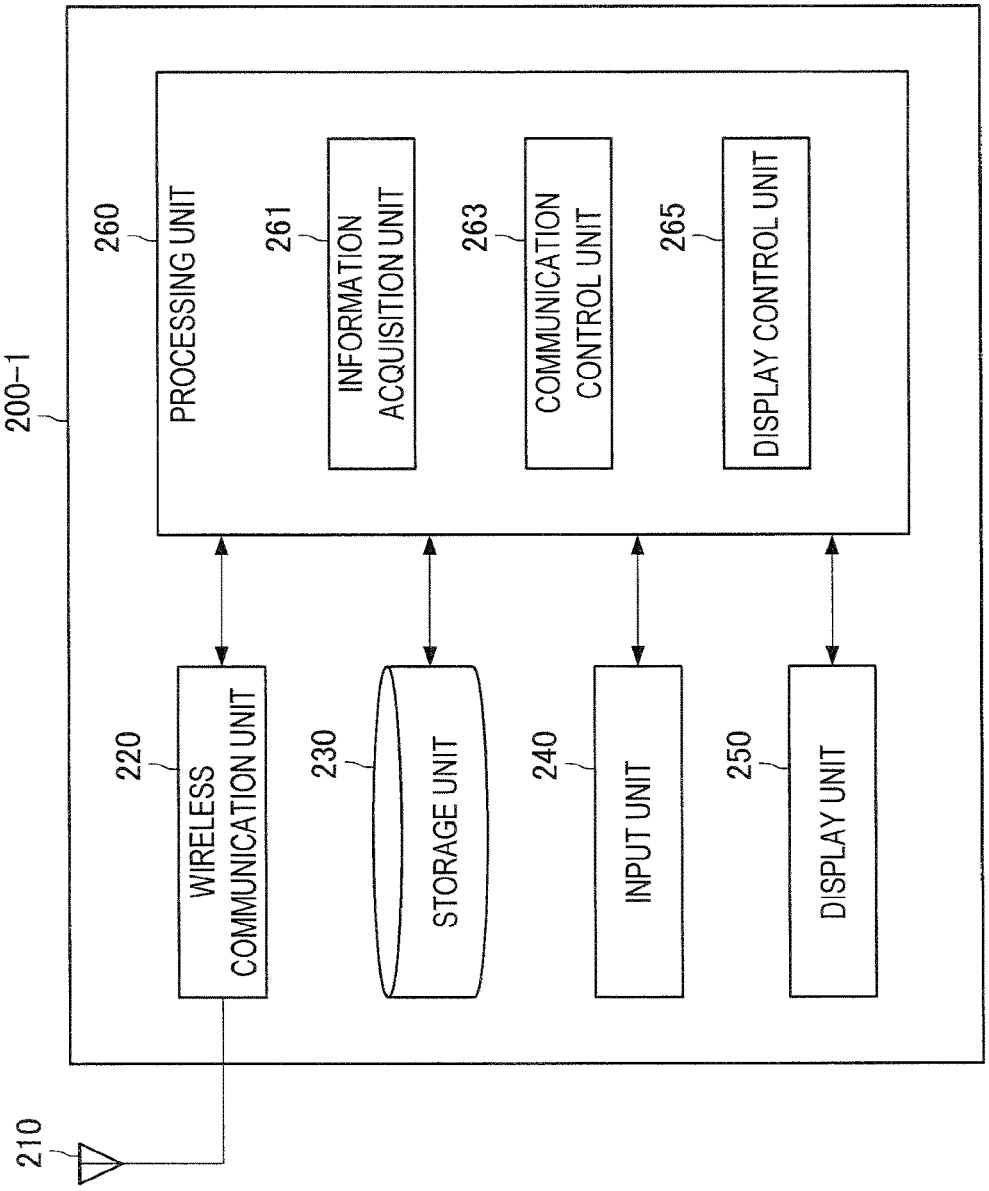
FIG. 15 is a block diagram illustrating an exemplary configuration of a terminal device according to the first embodiment.

Next, an exemplary configuration of the terminal device 200-1 according to the first embodiment will be described with reference to FIG. 15. FIG. 15 is a block diagram illustrating the exemplary configuration of the terminal device 200-1 according to the first embodiment. Referring to FIG. 15, the terminal device 200-1 is configured to include an antenna unit 210, a wireless communication unit 220, a storage unit 230, an input unit 240, a display unit 250, and a processing unit 260.

(Antenna Unit 210)

The antenna unit 210 radiates signals, which are outputted by the wireless communication unit 220, into space as radio waves. In addition, the antenna unit 210 converts the radio waves coming from space into signals and outputs the signals to the wireless communication unit 220.

(Wireless Communication Unit 220)

The wireless communication unit 220 performs wireless communication. In one example, the wireless communication unit 220 receives a downlink signal from the base station 100-1 and transmits an uplink signal to the base station 100-1 when the terminal device 200-1 is located within the cell 10.

(Storage Unit 230)

The storage unit 230 stores a program and data used to operate the terminal device 200-1 in a temporary or permanent manner.

(Input Unit 240)

The input unit 240 receives an operation by the user of the terminal device 200-1 as an input. Then, the input unit 240 provides a result obtained by the input for the processing unit 260.

(Display Unit 250)

The display unit 250 displays a screen (i.e. picture) of the terminal device 200-1. In one example, the display unit 250 displays the screen under the control by the processing unit 260 (display control unit 265).

(Processing Unit 260)

The processing unit 260 implements various functions of the terminal device 200-1. The processing unit 260 is configured to include an information acquisition unit 261, a communication control unit 263, and a display control unit 265.

(Information Acquisition Unit 261)

The information acquisition unit 261 acquires the specific information, which is used to specify the PMCH of two or more CCs including the first CC and is transmitted on the first CC by the base station 100-1.

Particularly, in the first embodiment, the specific information is the MCCH scheduling information for the two or more CCs. In other words, the information acquisition unit 261 acquires the MCCH scheduling information for the two or more CCs.

As described above, for example, the MCCH scheduling information is included in the predetermined SIB (e.g., SIB 13), and the information acquisition unit 261 acquires the MCCH scheduling information included in the predetermined SIB. The predetermined SIB is, for example, the SIB of the first CC.

The contents of the MCCH scheduling information are as described previously with reference to the base station 100-1.

The foregoing has described the information acquisition unit 261 particularly based on the first CC. It will be understood that the MCCH scheduling information for two or more CCs including a different CC can be included in the predetermined SIB for the different CC. Then, the information acquisition unit 261 can acquire the MCCH scheduling information that is included in the predetermined SIB.

(Communication Control Unit 263)

The communication control unit 263 specifies a PMCH of the CC included in the two or more CCs based on the specific information.

Particularly, in the first embodiment, the specific information is the MCCH scheduling information for the two or more CCs. In other words, the communication control unit 263 specifies the PMCH of the CC included in the two or more CCs based on the MCCH scheduling information for the two or more CCs.

More specifically, for example, the communication control unit 263 specifies the MCCH of at least one CC of the two or more CCs based on the MCCH scheduling information for the two or more CCs. In other words, the communication control unit 263 specifies the radio frame and subframe in which the MCCH is located. Then, the communication control unit 263 acquires the MBSFN area configuration message transmitted on the specified MCCH for each of the at least one CC. Furthermore, the communication control unit 263 specifies the PMCH to which a desired MBMS session is mapped, based on the MBSFN area configuration message. In other words, the communication control unit 263 specifies a subframe to be allocated to the PMCH to which the desired MBMS session is mapped. Then, the communication control unit 263 acquires the desired MBMS session that is transmitted on the specified PMCH. In other words, the communication control unit 263 specifies a radio resource (subframe) to which the desired MBMS session is mapped from the MSI transmitted on the specified PMCH, and acquires the desired MBMS session transmitted through the specified radio resource.

The foregoing has described the communication control unit 263 based on the MCCH scheduling information for the two or more CCs, which is transmitted on the first CC. It will be understood that, based on the MCCH scheduling information for two or more CCs transmitted on a different CC included in the two or more CCs, the communication control unit 263 can specify the PMCH of the CC included in the two or more CCs.

(Display Control Unit 265)

The display control unit 265 controls the display unit 250 to display a screen. For example, the display control unit 265 generates a screen to be displayed by the display unit 250 and causes the display unit 250 to display the screen.

<3.3. Processing Procedure>

Subsequently, an example of a communication control process according to the first embodiment will be described with reference to FIGS. 16 and 17.

(Communication Control Process in Base Station)

FIG. 16 is a flowchart illustrating schematically an exemplary procedure of a communication control process by the base station 100-1 according to the first embodiment.

The information acquisition unit 151 acquires a predetermined SIB (e.g., SIB 13) that includes the MCCH scheduling information for two or more CCs (S301). The two or more CCs include the first CC.

The communication control unit 153 controls the transmission of the predetermined SIB on the first CC (S303). Then, the SIB 13 is transmitted on the first CC. Then, the process ends.

(Communication Control Process in Terminal Device)

FIG. 17 is a flowchart illustrating schematically an exemplary procedure of a communication control process by the terminal device 200-1 according to the first embodiment.

The information acquisition unit 261 acquires the MCCH scheduling information for two or more CCs (S311). More specifically, the two or more CCs include the first CC. The predetermined SIB (e.g., SIB 13) that includes the MCCH scheduling information is transmitted on the first CC. The information acquisition unit 261 acquires the MCCH scheduling information that is included in the predetermined SIB.

Next, the communication control unit 263 specifies an MCCH of at least one CC of the two or more CCs based on the MCCH scheduling information (S313). Then, the communication control unit 263 acquires the MBSFN area configuration message transmitted on the specified MCCH with respect to each of the at least one CC (S315).

Further, the communication control unit 263 specifies a PMCH to which a desired MBMS session is mapped, based on the MBSFN area configuration message (S317). In other words, the communication control unit 263 specifies a subframe to be allocated to the PMCH to which the desired MBMS session is mapped.

Then, the communication control unit 263 acquires the desired MBMS session transmitted on the specified PMCH (S319). In other words, the communication control unit 263 specifies a radio resource (subframe) to which the desired MBMS session is mapped from the MSI transmitted on the specified PMCH, and acquires the desired MBMS session transmitted through the specified radio resource. Then, the process ends.

<3.4. Modification>

Next, modifications of the first embodiment will be described with reference to FIG. 18. According to the modification of the first embodiment, the predetermined SIB (e.g., SIB 13) further includes different information for the two or more CCs, in addition to the MCCH scheduling information for the two or more CCs.

(Base Station 100-1: Information Acquisition Unit 151)

System Information Block (SIB)

In the modification of the first embodiment, the predetermined SIB (e.g., SIB 13) further includes different information for the two or more CCs.

Notification Information

In one example, the predetermined SIB further includes notification information for the two or more CC. The notification information notifies the terminal device 200-1 of the location of information used to indicate a change of the MCCH.

More specifically, for example, the notification information includes at least one of a notification indicator and a notification configuration. The notification indicator indicates which of PDCH bits is used to notify the terminal device 200-1 of the change of the MCCH. In addition, the notification configuration indicates a radio frame and subframe used to transmit the MCCH information change notification.

In one example, the notification information contains one or more pieces of individual notification information. In other words, the predetermined SIB includes the one or more pieces individual notification information. The detailed description will be given below on this point with reference to FIG. 18.

Figure 18:
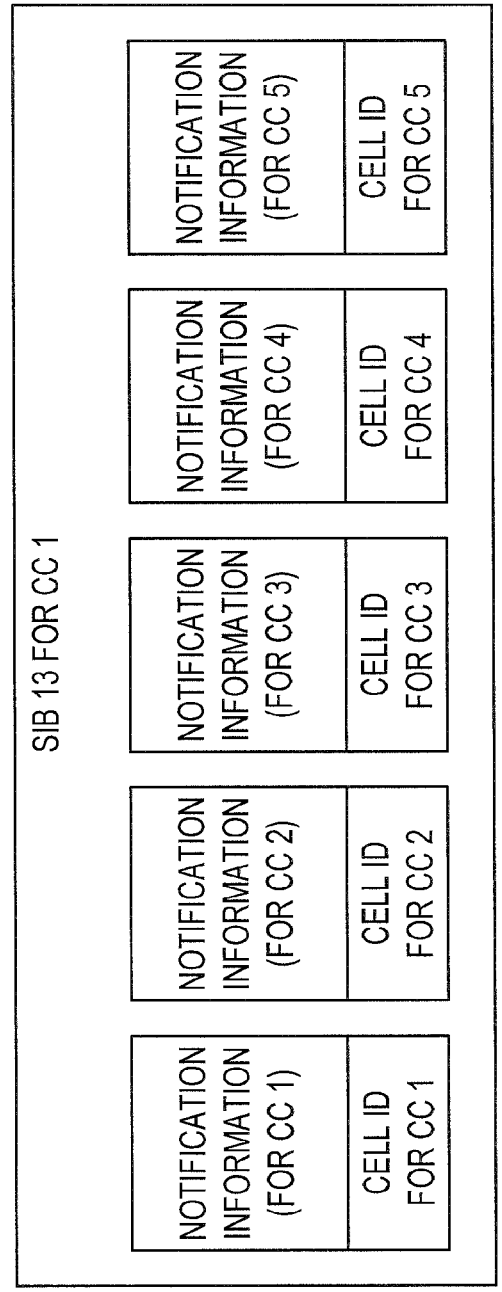
FIG. 18 is a diagram illustrated to describe an example of the SIB 13 including notification information for two or more CCs.

FIG. 18 is a diagram illustrated to describe an example of the SIB 13 that includes notification information for two or more CCs. Referring to FIG. 18, the SIB 13 for CC1 is illustrated. In this example, the base station 100-1 uses CC 1 to CC 5, and the SIB 13 includes individual notification information for each of the CC 1 to CC 5. In addition, five pieces of individual notification information are associated with a cell ID for each corresponding CC.

Although the example of FIG. 18 is an example in which the predetermined SIB includes individual notification information for each CC, in another example, the predetermined SIB may include notification information that is common among CCs.

As described above, the notification information for two or more CCs is included in the predetermined SIB. This allows, for example, the reduction in the load on the MBMS for the terminal device 200-1 that supports carrier aggregation. More specifically, for example, even when two or more CCs are used, it is not necessary for the terminal device 200-1 to receive and acquire the notification information for each of the two or more CCs, but can receive and acquire the notification information for the two or more CCs on one CC. Thus, it is possible to reduce the load on the terminal device 200-1 for specifying the location of information used to indicate a change of the MCCH.

Others

In one example, the predetermined SIB further includes an MBSFN area ID, non-MBSFN region length, and/or signaling modulation and coding scheme (MCS) for the two or more CCs, as different information for the two or more CCs. Thus, for example, the load on MBMS for the terminal device 200-1 that supports carrier aggregation is reduced.

(Terminal Device 200-1: Information Acquisition Unit 261)

In the modification of the first embodiment, the information acquisition unit 261 further acquires different information for the two or more CCs.

In one example, as described above, the predetermined SIB includes the notification information for the two or more CCs, and the information acquisition unit 261 acquires the notification information that is included in the predetermined SIB.

In addition, the predetermined SIB further includes an MBSFN area ID, non-MBSFN region length, and/or signaling MCS for the two or more CCs, as different information for the two or more CCs, and the information acquisition unit 261 acquires these pieces of information.

(Terminal Device 200-1: Information Acquisition Unit 261)

In the modification of the first embodiment, for example, the communication control unit 263 specifies a location of the information to be used to indicate a change of an MCCH based on the notification information.

In addition, for example, the communication control unit 263 specifies the length of a non-MBSFN region in the MBSFN frame based on the non-MBSFN region length. In addition, for example, the communication control unit 263 specifies applicable MCS based on the signaling MCS.

4. SECOND EMBODIMENT

Subsequently, a second embodiment of the present disclosure will be described with reference to FIGS. 19 to 37.

In the embodiment of the present disclosure, the base station 100 transmits specific information on a first CC. The specific information is used to specify a PMCH of two or more CCs including the first CC. Particularly, in the second embodiment, the specific information is MBSFN area configuration information for the two or more CCs. In other words, the base station 100 transmits the MBSFN area configuration information for the two or more CCs on the first CC included in the two or more CCs. This makes it possible to reduce, for example, the load on the MBMS for the terminal device 200.

<4.1. Configuration of Base Station>

Figure 19:
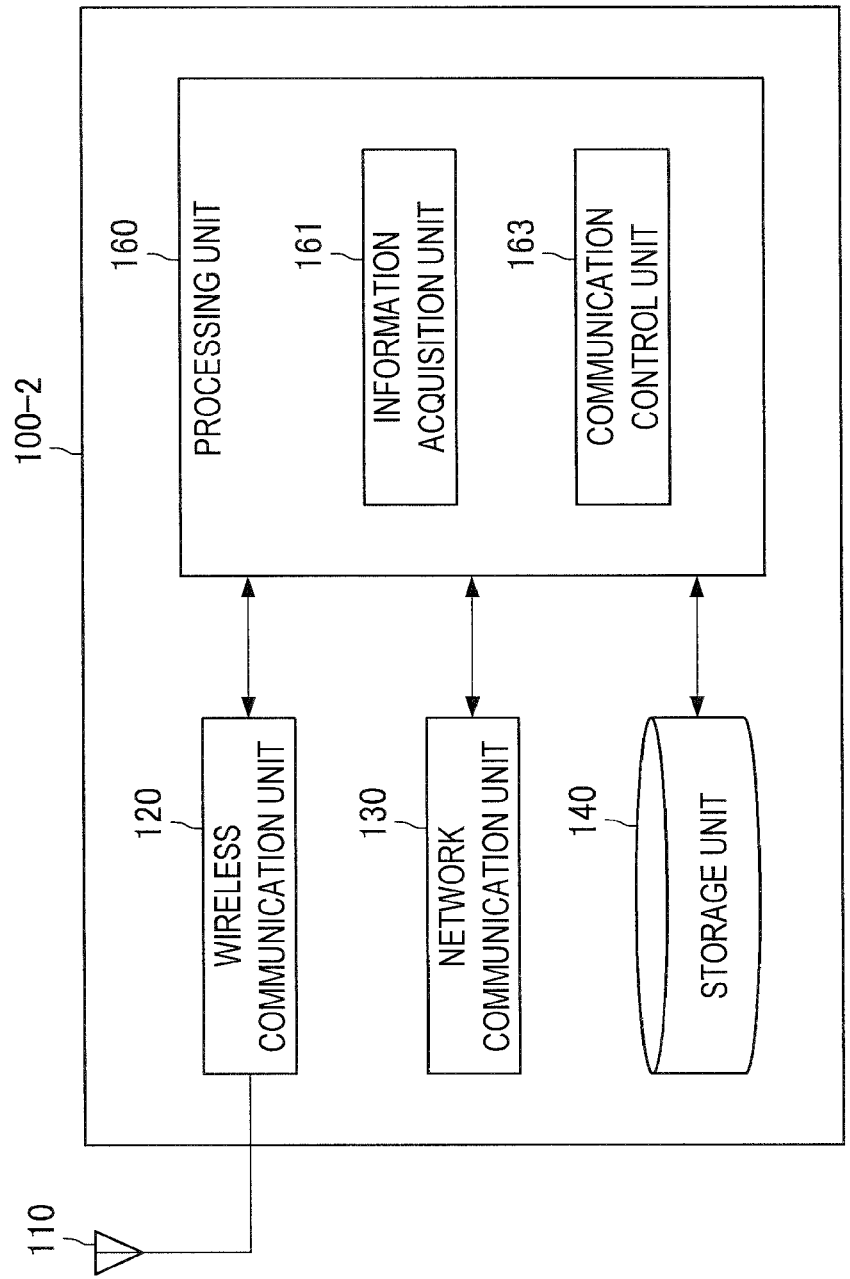
FIG. 19 is a block diagram illustrating an exemplary configuration of a base station according to a second embodiment.

The exemplary configuration of a base station 100-2 according to the first embodiment will be first described with reference to FIGS. 19 to 25. FIG. 19 is a block diagram illustrating an exemplary configuration of the base station 100-2 according to the second embodiment. Referring to FIG. 19, the base station 100-2 is configured to include an antenna unit 110, a wireless communication unit 120, a network communication unit 130, a storage unit 140, and a processing unit 160.

For the antenna unit 110, the wireless communication unit 120, the network communication unit 130, and the storage unit 140, there is no particular difference between the first embodiment and the second embodiment. Thus, in this description, only the processing unit 160 will be described.

(Processing Unit 160)

The processing unit 160 implements various functions of the base station 100-2. The processing unit 160 is configured to include an information acquisition unit 161 and a communication control unit 163.

(Information Acquisition Unit 161)

The information acquisition unit 161 acquires specific information used to specify a PMCH of two or more CCs that includes the first CC.

Particularly, in the second embodiment, the specific information is MBSFN area configuration information for the two or more CCs. In other words, the information acquisition unit 161 acquires the MBSFN area configuration information for the two or more CCs.

MBSFN Area Configuration Message

The MBSFN area configuration information includes, for example, one or more MBSFN area configuration messages. In addition, each of the one or more MBSFN area configuration messages is the MBSFN area configuration message for at least one CC of the two or more CCs.

MBSFN Area Configuration Message for Each CC

In one example, the MBSFN area configuration information includes the MBSFN area configuration message for each of the two or more CCs. In other words, the information acquisition unit 161 acquires the MBSFN area configuration message for each of the two or more CCs. The detailed description will be given on this point with reference to FIG. 20.

Figure 20:
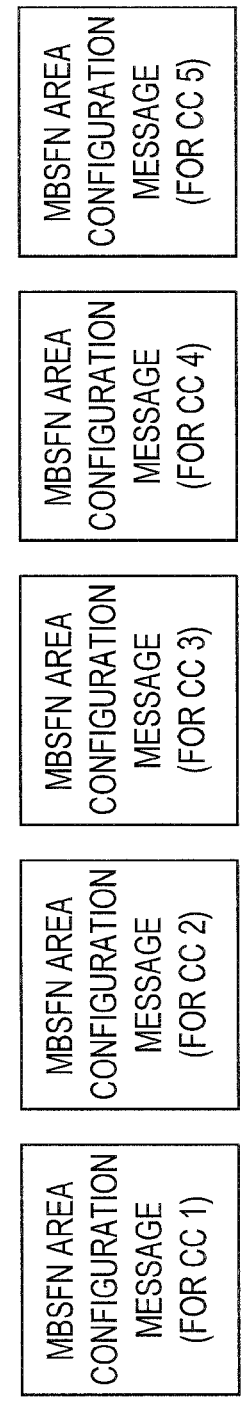
FIG. 20 is a diagram illustrated to describe an example of MBSFN area configuration information.

FIG. 20 is a diagram illustrated to describe an example of the MBSFN area configuration information. Referring to FIG. 20, five MBSFN area configuration messages are illustrated as the MBSFN area configuration information. In this example, the base station 100-2 uses CC 1 to CC 5, and the MBSFN area configuration information includes an MBSFN area configuration message for each of CC 1 to CC 5.

It is not necessary for the MBSFN area configuration information to include MBSFN area configuration messages for all the CCs used by the base station 100-2, but may include an MBSFN area configuration message for some of CCs. In one example, the MBSFN area configuration information may include the MBSFN area configuration messages for CC 1 to CC 3, not for CC 1 to CC 5 used by the base station 100-2. In other words, it is not necessary for the two or more CCs to be all the CCs (e.g., CC 1 to CC 5), but may be some of them (e.g., CC 1 to CC 3). In addition, these some of CCs may be changed depending on the type of CC on which the MBSFN area configuration information is transmitted.

Common MBSFN Area Configuration Message Between CCs

The one or more MBSFN area configuration messages may include an MBSFN area configuration message that is common between at least two CCs included in the two or more CCs. In other words, the information acquisition unit 161 may acquire the MBSFN area configuration message that is common between the at least two CCs.

In one example, the base station 100-2 uses CC 1 to CC 5, and the same MBSFN area configuration message may be used among CC 1 to CC 5. In this case, the information acquisition unit 161 may acquire the MBSFN area configuration message that is common among CC 1 to CC 5. Alternatively, the same MBSFN area configuration message may be used between at least two CC (e.g., CC 1 and CC 2). In this case, the information acquisition unit 161 may acquire an MBSFN area configuration message that is common between the at least two CCs (e.g., CC 1 and CC 2) and an MBSFN area configuration message for each of the remaining CCs (CC 3 to CC 5).

Details of Information Included in MBSFN Area Configuration Message

In one example, the MBSFN area configuration message includes common subframe allocation, a common subframe allocation period, and a PMCH information list. Accordingly, for example, the PMCH is specified. In other words, a subframe in which the PMCH is located is specified. The detailed description will be given on this point with reference to FIG. 21.

Figure 21:
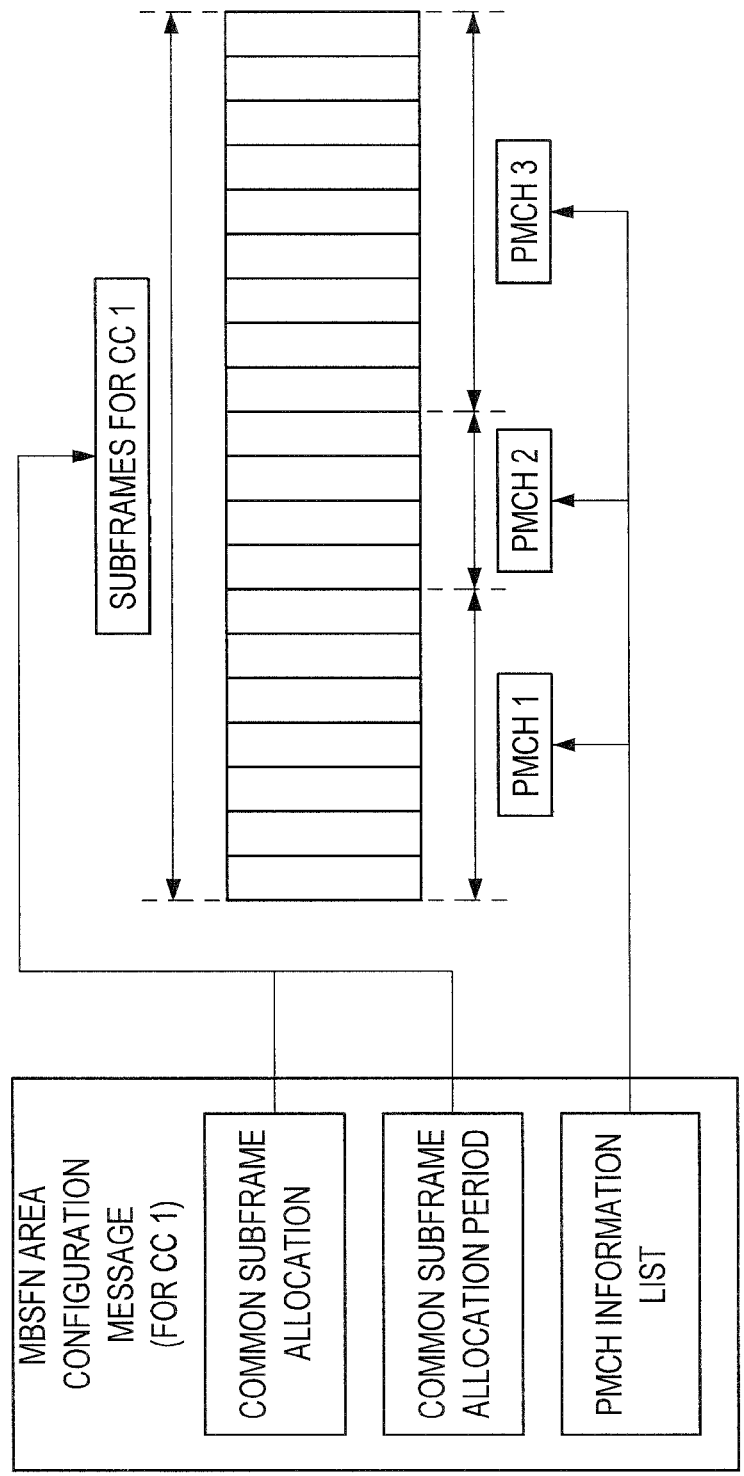
FIG. 21 is a diagram illustrated to describe an example of a subframe in which a PMCH is located.

FIG. 21 is a diagram illustrated to describe an example of a subframe in which the PMCH is located. Referring to FIG. 21, the MBSFN area configuration message for CC 1 is illustrated. The MBSFN area configuration message includes common subframe allocation, a common subframe allocation period, and a PMCH information list. The common subframe allocation indicates a subframe for MBSFN. In addition, the common subframe allocation period indicates a period during which a subframe indicated by the common subframe allocation is allocated to the PMCH. In other words, subframes to be allocated to the PMCH (e.g., 20 subframes) are specified from the common subframe allocation and the common subframe allocation period. Further, the PMCH information list (e.g., PMCH configuration) indicates a subframe to be allocated to each of the PMCHs (e.g., PMCHs 1 to 3). In this example, the PMCH information list indicates that, among 20 subframes, the first to seventh subframes are allocated to PMCH 1, the eighth to eleventh subframes are allocated to PMCH 2, and the twelfth to twentieth subframes are allocated to PMCH 3. The PMCH information list (e.g., MBMS session information list) further indicates an MBMS session (or MTCH) to be mapped to each of the PMCHs (PMCHs 1 to 3).

The foregoing has described the information acquisition unit 161 particularly based on the first CC (e.g., CC 1). It will be understood that the information acquisition unit 161 can acquire the MBSFN area configuration information for two or more CCs including different CCs (e.g., CC 2 to CC 5).

(Communication Control Unit 163)

The communication control unit 163 controls the transmission of the specific information on the first CC.

Particularly, in the second embodiment, as described above, the specific information is the MBSFN area configuration information for the two or more CCs. In other words, the communication control unit 163 controls the transmission of the MBSFN area configuration information on the first CC.

Transmission on MCCH

In one example, the communication control unit 163 controls the transmission of the MBSFN area configuration information on the MCCH of the first CC.

As described above, for example, the MBSFN area configuration information includes one or more MBSFN area configuration messages. In other words, the communication control unit 163 controls the transmission of the one or more MBSFN area configuration messages on the MCCH of the first CC.

In addition, the information to be transmitted on the MCCH includes the one or more MBSFN area configuration messages and the identification information of the CC that corresponds to each of the one or more MBSFN area configuration messages. The identification information is, for example, a cell ID. Thus, for example, the terminal device 200-2 can identify which of CCs is corresponded to individual MBSFN area configuration message transmitted on the MCCH.

MBSFN Area Configuration Message for Each CC

As described above, for example, the MBSFN area configuration information includes the MBSFN area configuration message for each of the two or more CCs. The detailed description of the transmission on the MCCH in such a case will be given with reference to FIG. 22.

Figure 22:
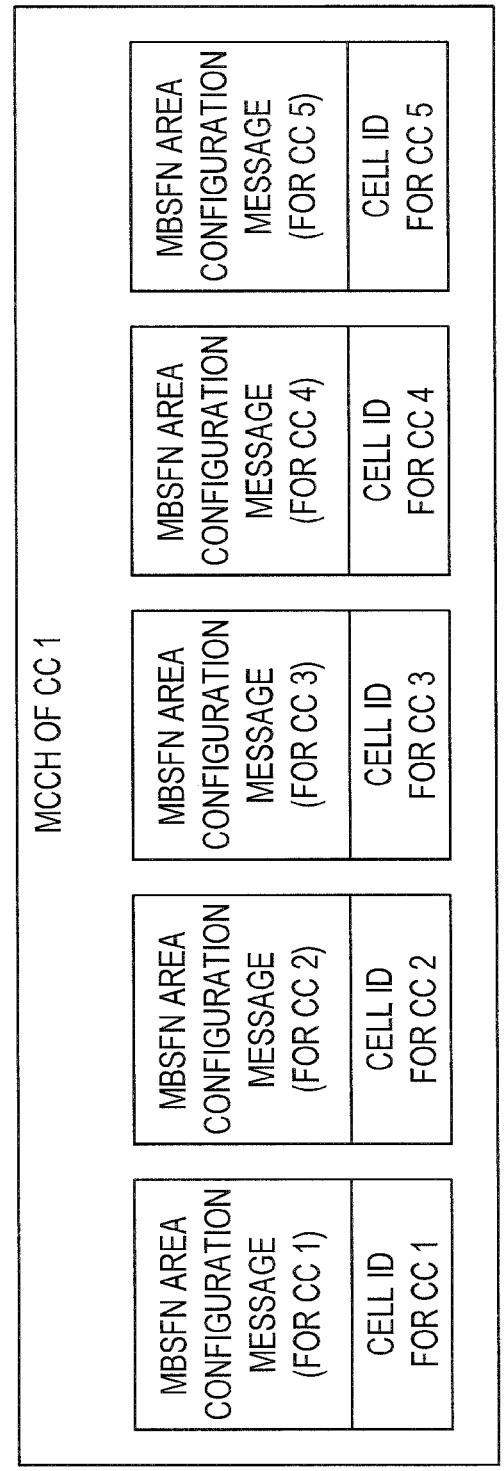
FIG. 22 is a diagram illustrated to describe a first example of the transmission on an MCCH of MBSFN area configuration information for two or more CCs.

FIG. 22 is a diagram illustrated to describe a first example of the transmission on the MCCH of MBSFN area configuration information for two or more CCs. Referring to FIG. 22, the MCCH of CC 1 is illustrated. In this example, the base station 100-2 uses CC 1 to CC 5, and the MBSFN area configuration information includes an MBSFN area configuration message for each of CC 1 to CC 5. Thus, the MBSFN area configuration message for each of CC 1 to CC 5 is transmitted on the MCCH. In addition, a cell ID of the CC corresponding to each of five MBSFN area configuration messages is also transmitted on the MCCH. The cell ID of CC is associated with the MBSFN area configuration message for the CC. In other words, the cell ID of the CC 1 is associated with the MBSFN area configuration message for the CC 1. In addition, the cell ID of the CC 3 is associated with the MBSFN area configuration message for the CC 3.

This makes it possible to determine, for example, a PMCH for each CC. More specifically, for example, it is possible to determine, for each CC, a subframe to be allocated to the PMCH, and an MBMS session or MTCH mapped to the PMCH.

As described above, it is not necessary for the MBSFN area configuration information to include the MBSFN area configuration messages for all the CCs used by the base station 100-2, but may include an MBSFN area configuration message for some of the CCs. In addition, some of the CCs may be changed depending on the type of CCs on which the MBSFN area configuration information is transmitted. The detailed description of the transmission on the MCCH in such a case will be given with reference to FIG. 23.

Figure 23:
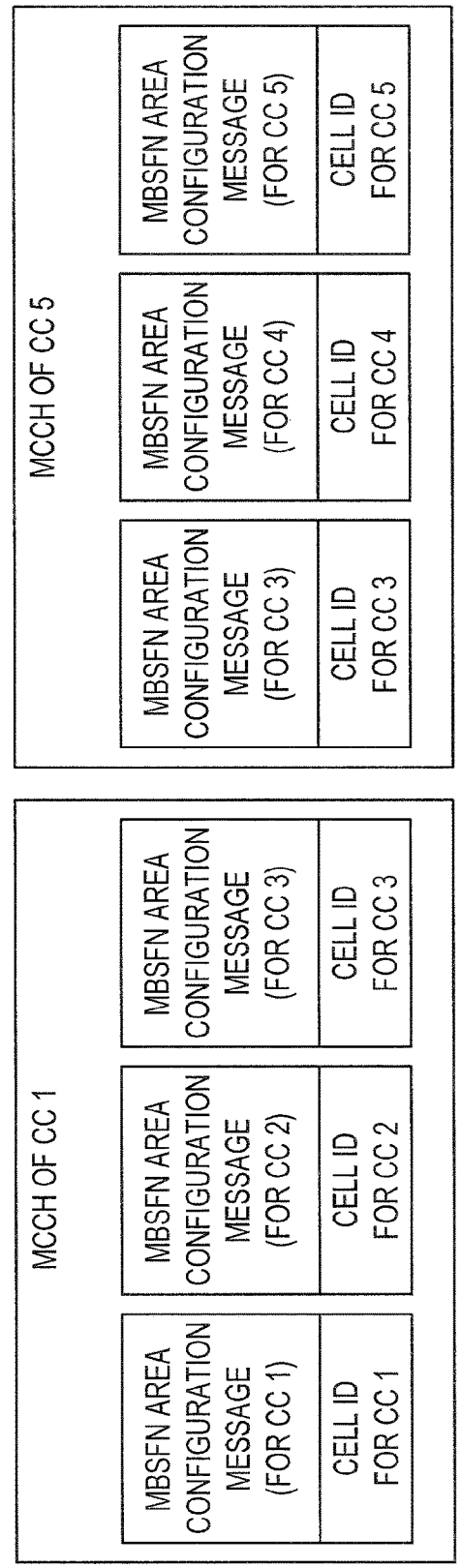
FIG. 23 is a diagram illustrated to describe a second example of the transmission on an MCCH of MBSFN area configuration information for two or more CCs.

FIG. 23 is a diagram illustrated to describe a second example of the transmission on the MCCH of MBSFN area configuration information for two or more CCs. Referring to FIG. 23, the MCCH of CC 1 and the MCCH of CC5 are illustrated. In this example, the base station 100-2 uses CC 1 to CC 5, and the MBSFN area configuration message for each of CC 1 to CC3 is transmitted on the MCCH of CC 1. In addition, the MBSFN area configuration message for each of CC 3 to CC 5 is transmitted on the MCCH of CC 5. Thus, the MBSFN area configuration messages for all the CCs used by the base station 100-2 are not necessarily transmitted on the MCCH of each CC.

Common MBSFN Area Configuration Message Between CCs

As described above, for example, the at least one MBSFN area configuration messages may include the MBSFN area configuration message that is common between at least two CCs included in the two or more CCs. In other words, the MBSFN area configuration information may include the MBSFN area configuration message that is common between the at least two CCs. The detailed description of the transmission on the MCCH in such a case will be given with reference to FIG. 24.

Figure 24:
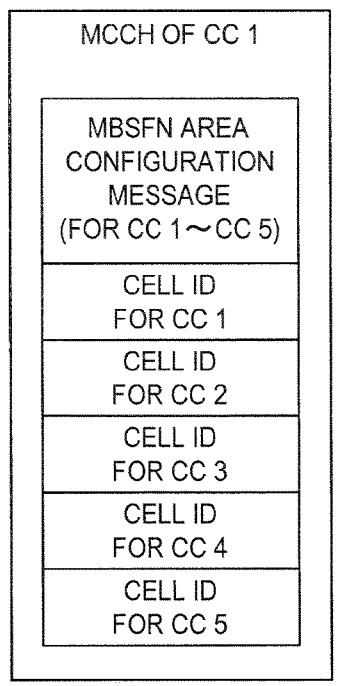
FIG. 24 is a diagram illustrated to describe a third example of the transmission on an MCCH of MBSFN area configuration information for two or more CCs.

FIG. 24 is a diagram illustrated to describe a third example of the transmission on the MCCH of MBSFN area configuration information for two or more CCs. Referring to FIG. 24, the MCCH of CC 1 is illustrated. In this example, the base station 100-2 uses CC 1 to CC 5, and the same MBSFN area configuration message is used among CC 1 to CC 5. Thus, the MBSFN area configuration message that is common among CC 1 to CC 5 is transmitted on the MCCH. The cell IDs of CC 1 to CC 5 are associated with the MBSFN area configuration message that is common among CC 1 to CC 5.

Figure 25:
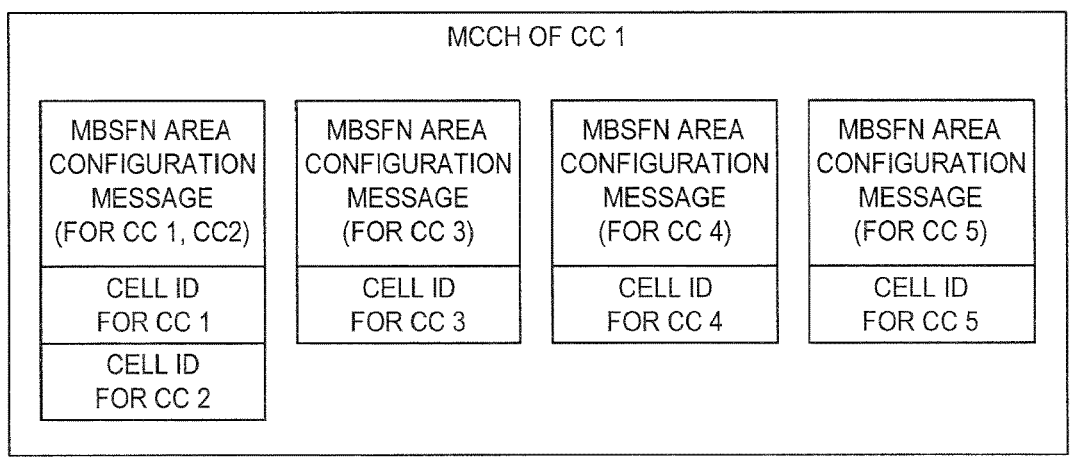
FIG. 25 is a diagram illustrated to describe a fourth example of the transmission on an MCCH of MBSFN area configuration information for two or more CCs.

FIG. 25 is a diagram illustrated to describe a fourth example of the transmission on the MCCH of MBSFN area configuration information for two or more CCs. Referring to FIG. 25, the MCCH of CC 1 is illustrated. In this example, the base station 100-2 uses CC 1 to CC 5, and the same MBSFN area configuration message is used between CC 1 and CC 2. Thus, the MBSFN area configuration message that is common between CC 1 and CC 2 is transmitted on the MCCH. The cell IDs of CC 1 and CC 2 are associated with the MBSFN area configuration message that is common between CC 1 and CC 2.

In this way, the MBSFN area configuration message that is common among CCs may be transmitted on the MCCH. Thus, for example, information to be transmitted is reduced. Accordingly, for example, a radio resource to be consumed radio resource to be used on the MCCH) can be reduced. In addition, for example, the power consumption of the base station 100-2 can be reduced.

Details of Transmission Control

In one example, the communication control unit 163 controls the transmission by mapping a signal of the MBSFN area configuration information (and CC identification information) to the radio resource of the MCCH of the first CC, as the control of the transmission. Thus, the MBSFN area configuration information (and CC identification information) is transmitted on the MCCH.

In another example, the communication control unit 163 may control the transmission by triggering the transmission of the MBSFN area configuration information (and CC identification information) on the MCCH of the first CC. Specifically, the communication control unit 163 may control the transmission by instructing another component of the base station 100-2 (e.g., another constituent element included in the processing unit 160) to transmit the MBSFN area configuration information (and CC identification information) on the MCCH of the first CC. Thus, the MBSFN area configuration information (and CC identification information) may be transmitted on the MCCH of the first CC.

As described above, the MBSFN area configuration information for two or more CCs including the first CC is transmitted on the first CC. For example, this makes it possible to reduce the load on the MBMS for the terminal device 200-2 that supports carrier aggregation. More specifically, for example, even when two or more CCs are used, it is not necessary for the terminal device 200-2 to receive and acquire the MBSFN area configuration message for each of the two or more CCs. For example, the MBSFN area configuration information for the two or more CCs can be received and acquired using one CC. Thus, it is possible to reduce the load on the terminal device 200-2 to specify the PMCH (i.e. subframe allocated to the PMCH).

Furthermore, it is not necessary for the terminal device 200-2 to receive and acquire the MCCH scheduling information on each of the two or more CCs, but the MCCH scheduling information may be received and acquired, for example, using one CC. Thus, the load on the terminal device 200-2 can be further reduced.

In one example, even when CCs for receiving MBMS sessions frequently vary with a change in communication quality of the CC, the terminal device 200-2 is not necessary to acquire the MCCH scheduling information and the MBSFN area configuration information each time the CC varies. In another example, even when the same MBMS session is transmitted on each CC as illustrated in FIG. 5 and the terminal device 200-2 receives the MBMS session on the CC having satisfactory communication quality, the terminal device 200-2 is not necessary to acquire the MCCH scheduling information and the MBSFN area configuration information on each CC. In still another example, even when different parts of the same MBMS session are transmitted on each CC as illustrated in FIG. 6 and the terminal device 200-2 receives the different parts on each CC, the terminal device 200-2 is not necessary to acquire the MCCH scheduling information and the MBSFN area configuration information on each CC. Thus, it is possible to reduce the load on the terminal device 200-2.

The foregoing has described the communication control unit 163 particularly based on the first CC (e.g., CC 1). It will be understood that the communication control unit 163 can control the transmission of the MBSFN area configuration information for two or more CCs including a different CC (e.g., any of CC 2 to CC 5) on the MCCH of the other CC.

<4.2. Configuration of Terminal Device>

Figure 26:
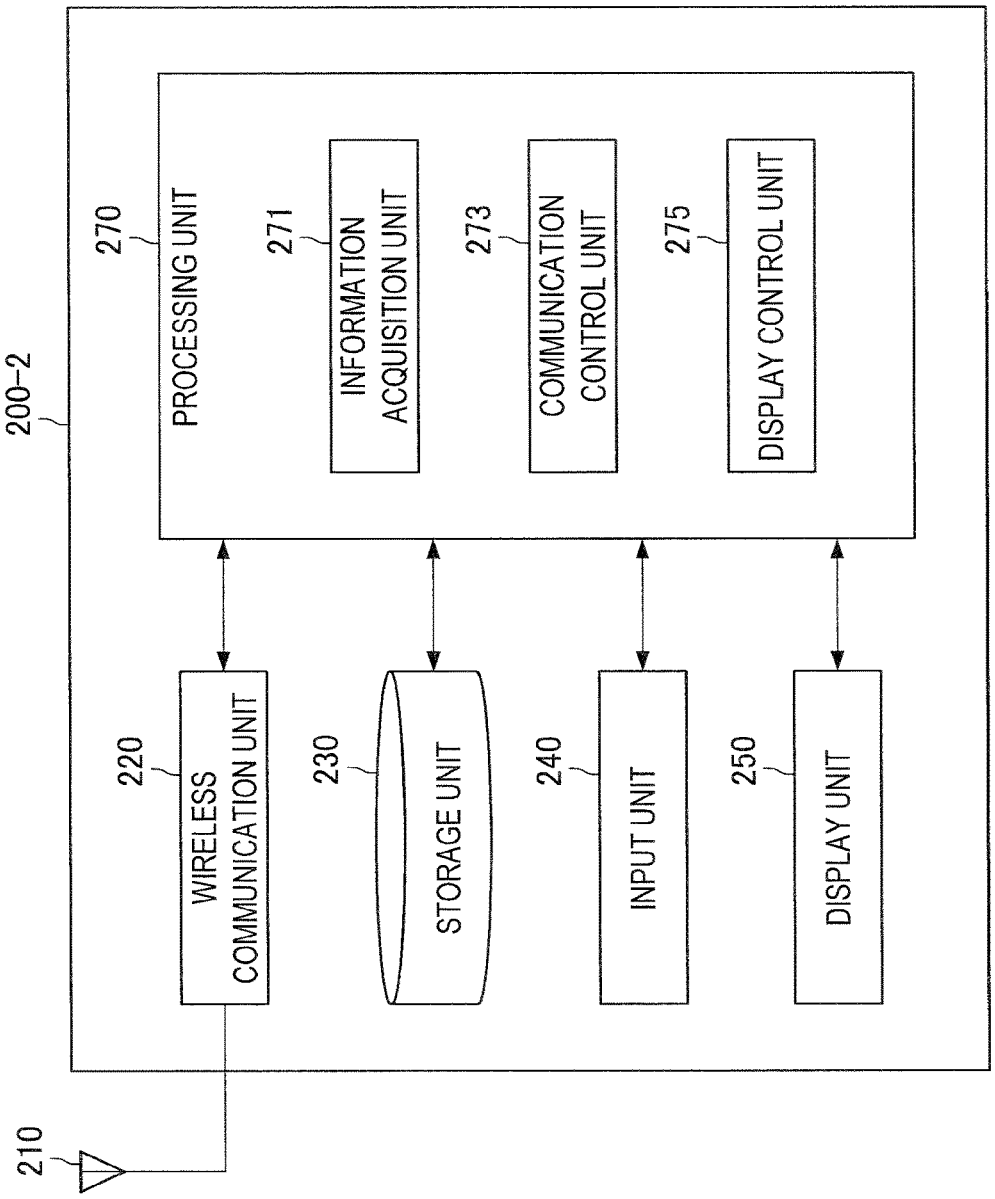
FIG. 26 is a block diagram illustrating an exemplary configuration of a terminal device according to the second embodiment.

Next, an exemplary configuration of the terminal device 200-2 according to the second embodiment will be described with reference to FIG. 26. FIG. 26 is a block diagram illustrating the exemplary configuration of the terminal device 200-2 according to the second embodiment. Referring to FIG. 26, the terminal device 200-2 is configured to include an antenna unit 210, a wireless communication unit 220, a storage unit 230, an input unit 240, a display unit 250, and a processing unit 270.

For the antenna unit 210, the wireless communication unit 220, the storage unit 230, the input unit 240, and the display unit 250, there is no particular difference between the first embodiment and the second embodiment. Thus, in this description, only the processing unit 270 will be described.

(Processing Unit 270)

The processing unit 270 implements various functions of the terminal device 200-2. The processing unit 270 is configured to include an information acquisition unit 271, a communication control unit 273, and a display control unit 275.

(Information Acquisition Unit 271)

The information acquisition unit 271 acquires the specific information, which is used to specify the PMCH of two or more CCs including the first CC and is transmitted on the first CC by the base station 100-2.

Particularly, in the second embodiment, the specific information is MBSFN area configuration information for the two or more CCs. In other words, the information acquisition unit 271 acquires the MBSFN area configuration information for the two or more CCs.

As described above, for example, the MBSFN area configuration information is transmitted on the MCCH of the first CC. The information acquisition unit 271 acquires the MBSFN area configuration information transmitted on the MCCH of the first CC.

The contents of the MBSFN area configuration information is as described previously in connection with the base station 100-2.

The foregoing has described the information acquisition unit 271 particularly based on the first CC. It will be understood that the MBSFN area configuration information for two or more CCs including a different CC can be transmitted on the MCCH of the other CC. The information acquisition unit 271 can acquire the MBSFN area configuration information transmitted on the MCCH of the other CC.

(Communication Control Unit 273)

The communication control unit 273 specifies a PMCH of the CC included in the two or more CCs based on the specific information.

Particularly, in the second embodiment, the specific information is the MBSFN area configuration information for the two or more CCs. In other words, the communication control unit 273 specifies the PMCH of the CC included in the two or more CCs based on the MBSFN area configuration information for the two or more CCs.

More specifically, for example, the communication control unit 273 specifies a PMCH to which a desired MBMS session is mapped, based on the MBSFN area configuration information for the two or more CCs. In other words, the communication control unit 273 specifies a subframe to be allocated to the PMCH to which a desired MBMS session is mapped. Then, the communication control unit 273 acquires the desired MBMS session transmitted on the specified PMCH. In other words, the communication control unit 273 specifies a radio resource (subframe) to which the desired MBMS session is mapped, from the MSI transmitted on the specified PMCH, and acquires the desired MBMS session transmitted through the specified radio resource.

The foregoing has described the communication control unit 273 based on the MBSFN area configuration information for the two or more CCs, which is transmitted on the first CC. It will be understood that, based on the MBSFN area configuration information for two or more CCs transmitted on a different CC included in the two or more CCs, the communication control unit 273 can specify the PMCH of the CC included in the two or more CCs.

(Display Control Unit 275)

The display control unit 275 controls the display unit 250 to display a screen. For example, the display control unit 275 generates a screen to be displayed by the display unit 250 and causes the display unit 250 to display the screen.

<4.3. Processing Procedure>

Subsequently, an example of a communication control process according to the second embodiment will be described with reference to FIGS. 27 and 28.

(Communication Control Process in Base Station)

Figure 27:
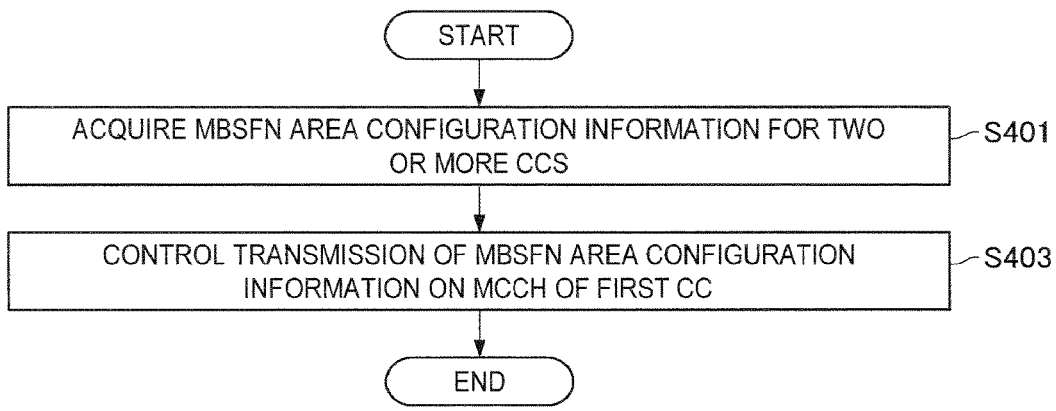
FIG. 27 is a flowchart illustrating schematically an exemplary procedure of a communication control process by a base station according to the second embodiment.

FIG. 27 is a flowchart illustrating schematically an exemplary procedure of a communication control process by the base station 100-2 according to the second embodiment.

The information acquisition unit 161 acquires the MBSFN area configuration information for two or more CCs (S401). The two or more CCs include the first CC.

The communication control unit 163 controls the transmission of the MBSFN area configuration information on the MCCH of the first CC (S403). Then, the MBSFN area configuration information on the MCCH of the first CC is transmitted. Then, the process ends.

(Communication Control Process in Terminal Device)

Figure 28:
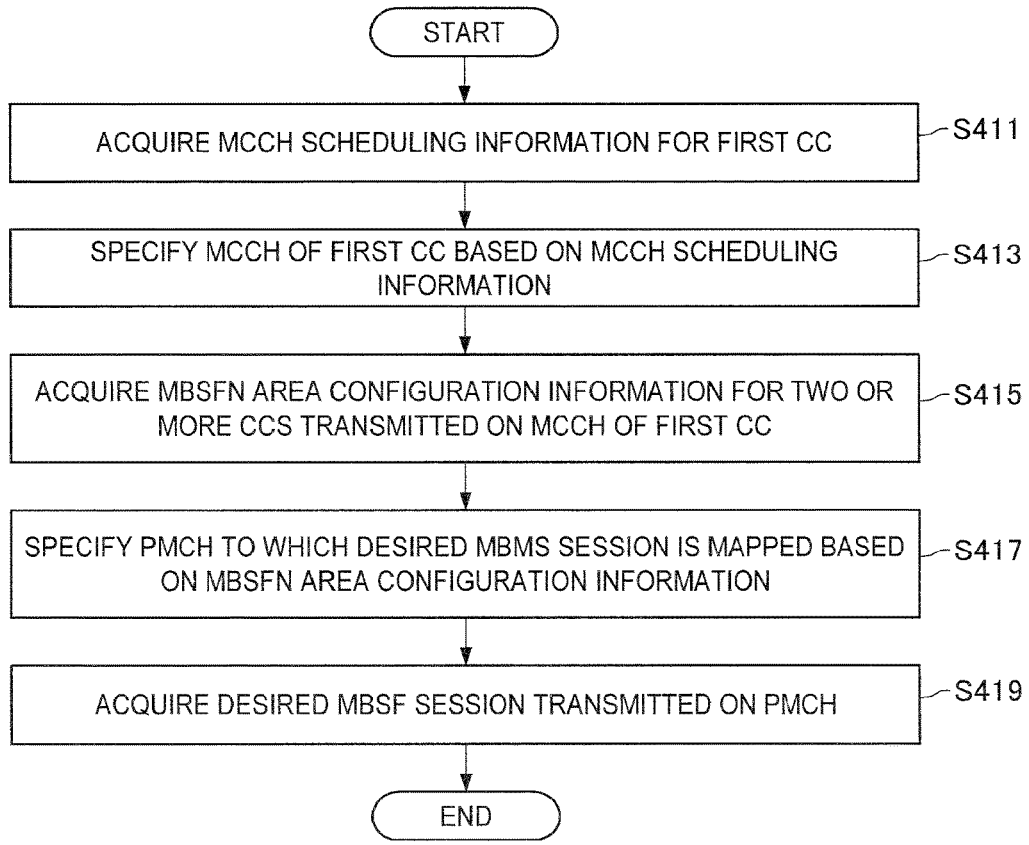
FIG. 28 is a flowchart illustrating schematically an exemplary procedure of a communication control process by the terminal device according to the second embodiment.

FIG. 28 is a flowchart illustrating schematically an exemplary procedure of a communication control process by the terminal device 200-2 according to the second embodiment.

The information acquisition unit 271 acquires the MCCH scheduling information for the first CC (S411). More specifically, the predetermined SIB (SIB 13) that includes the MCCH scheduling information is transmitted on the first CC. The information acquisition unit 271 acquires the MCCH scheduling information that is included in the predetermined SIB.

Next, the information acquisition unit 271 specifies an MCCH of the first CC based on the MCCH scheduling information (S413). Then, the information acquisition unit 271 acquires the MBSFN area configuration information for two or more CCs including the first CC, which is transmitted on the MCCH of the first CC (S415).

Further, the communication control unit 273 specifies a PMCH to which a desired MBMS session is mapped, based on the MBSFN area configuration information (S417). In other words, the communication control unit 273 specifies a subframe to be allocated to the PMCH to which the desired MBMS session is mapped.

Then, the communication control unit 273 acquires the desired MBMS session transmitted on the specified PMCH (S419). In other words, the communication control unit 273 specifies a radio resource (subframe) to which the desired MBMS session is mapped from the MSI transmitted on the specified PMCH, and acquires the desired MBMS session transmitted through the specified radio resource. Then, the process ends.

<4.4. First Modification>

A first modification of the second embodiment will be described with reference to FIGS. 29 to 33.

As described above, in the second embodiment, the MBSFN area configuration information for two or more CCs including the first CC is transmitted on the first CC. In addition, as described above, for example, the MBSFN area configuration information includes one or more MBSFN area configuration messages.

On the other hand, according to the first modification of the second embodiment, the MBSFN area configuration information includes one MBSFN area configuration message including one or more pieces of PMCH allocation information.

(Base Station 100-2: Information Acquisition Unit 161)

MBSFN Area Configuration Message

In the first modification, the MBSFN area configuration information includes one MBSFN area configuration message including one or more pieces of PMCH allocation information. In addition, each of the one or more pieces of PMCH allocation information is PMCH allocation information for at least one CC of the two or more CCs. The PMCH allocation information is, for example, information that indicates at least a subframe in which the PMCH is located.

In addition, for example, the one MBSFN area configuration message includes the one or more pieces of PMCH allocation information and the identification information of the CC that corresponds to the one or more pieces of PMCH allocation information. The identification information is, for example, a cell ID. Thus, for example, the terminal device 200-2 can identify which of CCs corresponds to individual PMCH allocation information included in the one MBSFN area configuration message.

MBSFN Area Configuration Message for Each CC

In one example, the one MBSFN area configuration message includes the PMCH allocation information for each of the two or more CCs. The detailed description will be given on this point with reference to FIG. 29.

Figure 29:
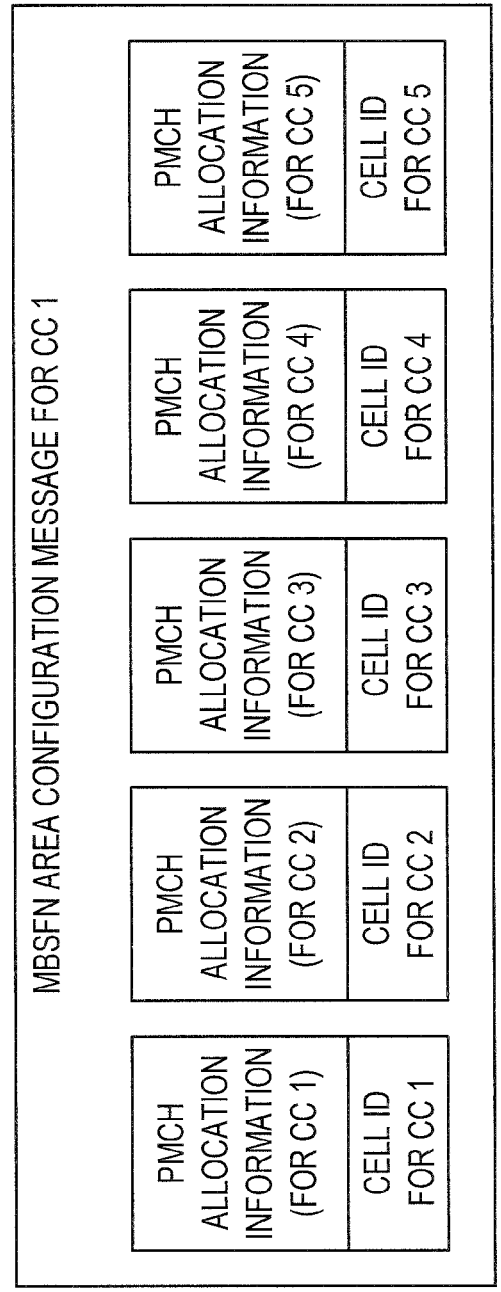
FIG. 29 is a diagram illustrated to describe a first example of an MBSFN area configuration message including one or more pieces of PMCH allocation information.

FIG. 29 is a diagram illustrated to describe a first example of the MBSFN area configuration message that includes one or more pieces of PMCH allocation information. Referring to FIG. 29, the MBSFN area configuration message for CC 1 is illustrated. In this example, the base station 100-2 uses CC 1 to CC 5, and the MBSFN area configuration message includes the PMCH allocation information for each of CC 1 to CC 5. In addition, the MBSFN area configuration message includes a cell ID of the CC that corresponds to each of five pieces of PMCH allocation information. The cell ID of the CC is associated with the PMCH allocation information for the CC. In other words, the cell ID for CC 1 is associated with the PMCH allocation information for CC 1. In addition, the cell ID for CC 3 is associated with the PMCH allocation information for CC 3.

Thus, for example, it is possible to determine the PMCH for each CC.

It is not necessary for the one MBSFN area configuration message to include the PMCH allocation information for all the CCs (e.g., CC 1 to CC 5) used by the base station 100-2, but may include the PMCH allocation information for some of the CCs. In other words, it is not necessary for the two or more CCs to be all the CCs (e.g., CC 1 to CC 5), but may be some of them. In addition, these some of CCs may be changed depending on the type of CC on which the one MBSFN area configuration message is transmitted. The detailed description will be given on this point with reference to FIG. 30.

Figure 30:
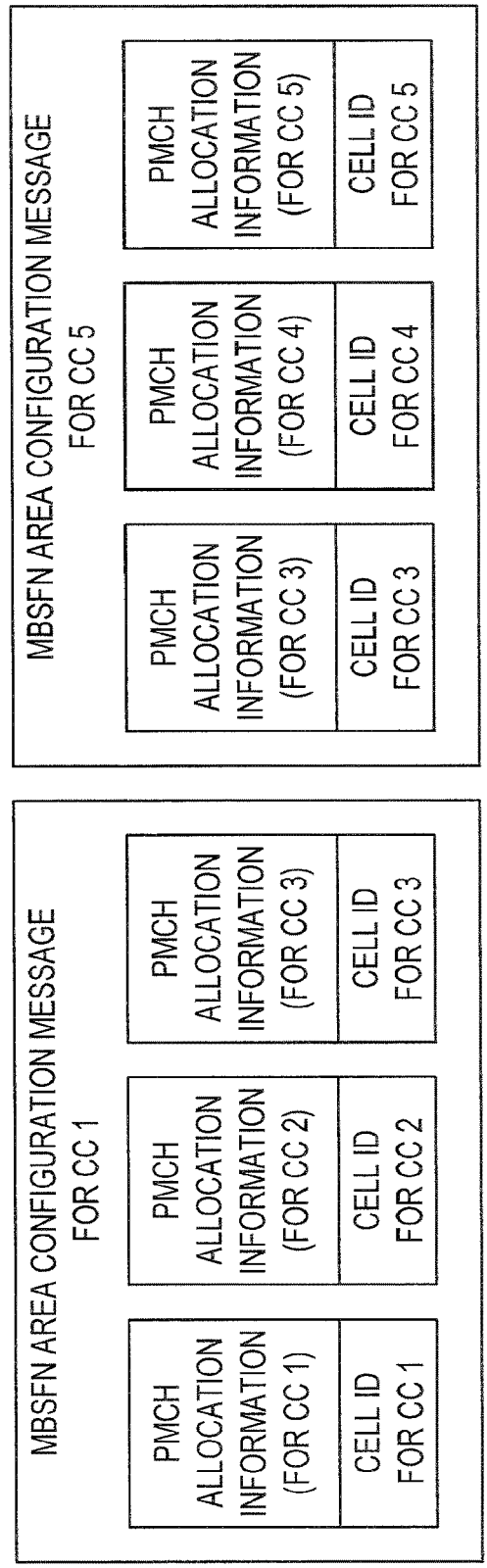
FIG. 30 is a diagram illustrated to describe a second example of an MBSFN area configuration message including one or more pieces of PMCH allocation information.

FIG. 30 is a diagram illustrated to describe a second example of the MBSFN area configuration message including one or more pieces of PMCH allocation information. Referring to FIG. 30, the MBSFN area configuration message for CC 1 and the MBSFN area configuration message for CC5 are illustrated. In this example, the base station 100-2 uses CC 1 to CC 5, and the MBSFN area configuration message for CC 1 includes the PMCH allocation information for each of CC 1 to CC 3. In addition, the MBSFN area configuration message for CC 5 includes the PMCH allocation information for each of CC 3 to CC 5. Thus, the PMCH allocation information for all the CCs used by the base station 100-2 is not necessarily included in the MBSFN area configuration message for each CC.

Common PMCH Allocation Information Between CCs

The one or more pieces of PMCH allocation information may include the PMCH allocation information that is common between at least two CCs included in the two or more CCs. In other words, the information acquisition unit 161 may acquire the MBSFN area configuration message that includes the PMCH allocation information that is common between the at least two CCs. The detailed description will be given on this point with reference to FIGS. 31 and 32.

Figure 31:
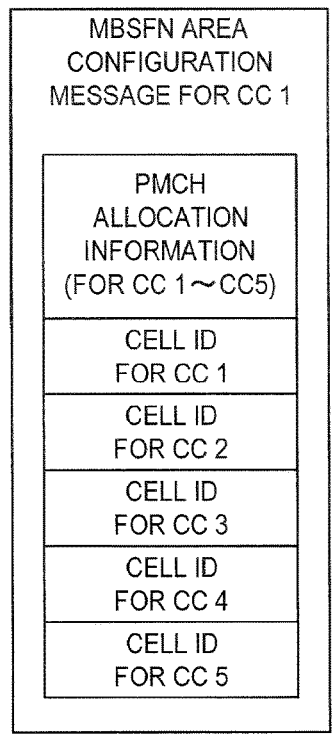
FIG. 31 is a diagram illustrated to describe a third example of an MBSFN area configuration message including one or more pieces of PMCH allocation information.

FIG. 31 is a diagram illustrated to describe a third example of the MBSFN area configuration message that includes one or more pieces of PMCH allocation information. Referring to FIG. 31, the MBSFN area configuration message for CC 1 is illustrated. In this example, the base station 100-2 uses CC 1 to CC 5, and the allocation of PMCH is the same among CC 1 to CC 5. Thus, the MBSFN area configuration message includes the PMCH allocation information that is common among CC 1 to CC 5. In addition, the MBSFN area configuration message includes the cell IDs of CC 1 to CC 5 that corresponds to the PMCH allocation information. The cell IDs of CC 1 to CC 5 are associated with the PMCH allocation information that is common among CC 1 to CC 5.

Figure 32:
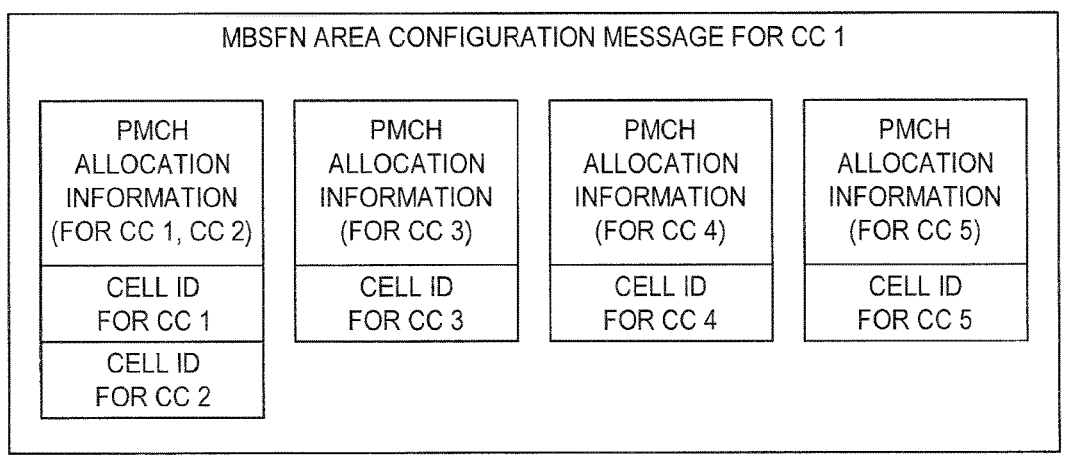
FIG. 32 is a diagram illustrated to describe a fourth example of an MBSFN area configuration message including one or more pieces of PMCH allocation information.

FIG. 32 is a diagram illustrated to describe a fourth example of the MBSFN area configuration message that includes one or more pieces of PMCH allocation information. Referring to FIG. 32, the MBSFN area configuration message for CC 1 is illustrated. In this example, the base station 100-2 uses CC 1 to CC 5, and the allocation of PMCH is the same between CC1 and CC 2. Thus, the MBSFN area configuration message includes the PMCH allocation information that is common between CC1 and CC 2. In addition, the MBSFN area configuration message includes the cell IDs of CC 1 and CC 2 that corresponds to the PMCH allocation information. The cell IDs of CC 1 and CC 2 are associated with the PMCH allocation information that is common between CC 1 and CC 2.

In this way, the PMCH information that is common among CCs may be used. Thus, for example, information to be transmitted is reduced. Accordingly, for example, radio resources to be consumed (e.g., radio resource to be used for an MBSFN area configuration message) can be reduced. In addition, for example, the power consumption of the base station 100-2 can be reduced.

Details of Information Contained in PMCH Allocation Information

In one example, each of the one or more pieces of PMCH allocation information includes at least the PMCH information list. In addition, for example, each of the one or more pieces of PMCH allocation information further includes common subframe allocation and common subframe allocation period. Thus, for example, a PMCH to which a desired MBMS session and/or MTCH is mapped is specified. In other words, a subframe in which the PMCH is located is specified.

(Base Station 100-2: Communication Control Unit 163)

Transmission on MCCH

As described above, for example, the communication control unit 163 controls the transmission of the MBSFN area configuration information on the MCCH of the first CC.

Particularly, in the first modification, the MBSFN area configuration information includes one MBSFN area configuration message including one or more pieces of PMCH allocation information. In other words, the communication control unit 163 controls the transmission of the one MBSFN area configuration message on the MCCH of the first CC. The detailed description will be given on this point with reference to FIG. 33

Figure 33:
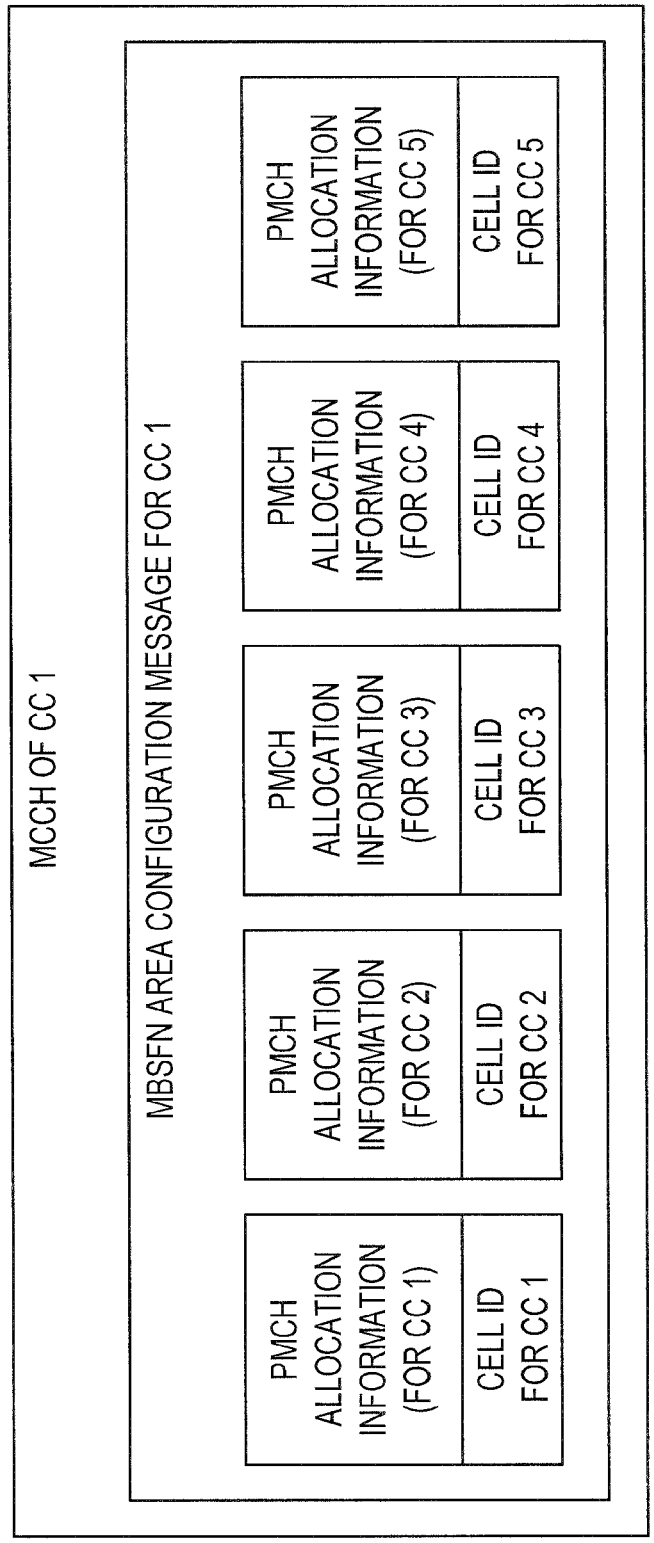
FIG. 33 is a diagram illustrated to describe an example of the transmission on an MCCH of an MBSFN area configuration message including one or more pieces of PMCH allocation information.

FIG. 33 is a diagram illustrated to describe an example of the transmission on the MCCH of the MBSFN area configuration message that includes one or more pieces of PMCH allocation information. Referring to FIG. 33, the MCCH of CC 1 is illustrated. The MBSFN area configuration message for CC 1 is transmitted on the MCCH of CC 1. In this example, the base station 100-2 uses CC 1 to CC 5, and the MBSFN area configuration message includes the PMCH allocation information for each of CC 1 to CC 5.

As described above, the MBSFN area configuration information for two or more CCs including the first CC is transmitted on the first CC. Thus, for example, it is possible to reduce the load on the MBMS for the terminal device 200-2 that supports carrier aggregation. This point is as described previously in the second embodiment.

<4.5. Second Modification>

A second modification of the second embodiment will be described with reference to FIGS. 34 to 37.

In general, the PMCH is present in each CC. In other words, the PMCH is located in a radio resource within one CC. On the other hand, in the second modification, a PMCH that covers at least two CCs is newly defined. Then, the MBSFN area configuration information includes information indicating the PMCH that covers at least two CCS included in the two or more CCs.

(MBSFN Area Configuration Information)

In the second modification, a PMCH that covers at least two CCs included in the two or more CCs including the first CC (hereinafter referred to as "multiple CC PMCH") is determined as the PMCH to be used in an MBSFN area. In this case, the MBSFN area configuration information for the two or more CCs includes information indicating a multiple CC PMCH. The detailed description will be given on this point with reference to FIGS. 34 and 35.

Figure 34:
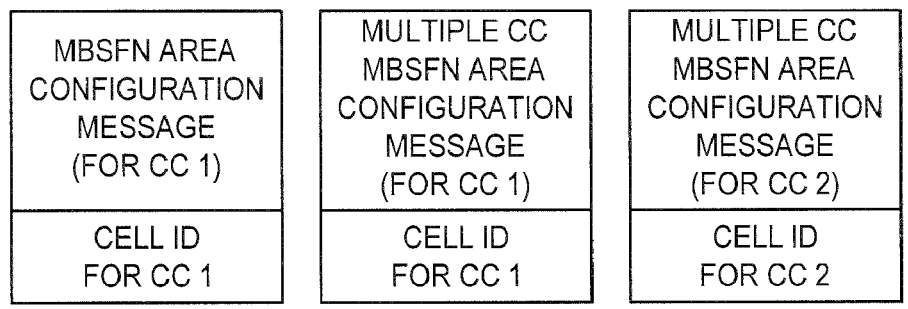
FIG. 34 is a diagram illustrated to describe a first example of MBSFN area configuration information including information that indicates a multiple CC PMCH.

FIG. 34 is a diagram illustrated to describe a first example of the MBSFN area configuration information that includes information indicating a multiple CC PMCH. Referring to FIG. 34, three MBSFN area configuration messages are illustrated as the MBSFN area configuration information. In this example, one of the three MBSFN area configuration messages is a normal MBSFN area configuration message for CC 1 (i.e. it indicates PMCH of CC 1). In addition, the remaining two of the three MBSFN area configuration messages are multiple CC MBSFN area configuration messages for CC 1 and CC 2. These two multiple CC MBSFN area configuration messages indicate the multiple CC PMCH that covers CC 1 and CC 2. For example, the multiple CC MBSFN area configuration message for CC 1 includes a radio resource (subframe) of the CC 1 allocated to the multiple CC PMCH and identification information of another CC in which the multiple CC PMCH is located (e.g., cell ID of CC 2). In addition, the multiple CC MBSFN area configuration message for CC 2 includes a radio resource (subframe) of the CC 2 allocated to the multiple CC PMCH and identification information of another CC in which the multiple CC PMCH is located (e.g., cell ID of CC 1). In addition, when a plurality of multiple CC PMCHs covering CC 1 and CC 2 are determined as the PMCH to be used in the MBSFN area, the multiple CC MBSFN area configuration message for each of CC 1 and CC2 may further include identification information for identifying the multiple CC PMCH. Accordingly, radio resources are associated between CCs, and thus it is possible for the terminal device 200-2 to specify a multiple CC PMCH.

Figure 35:
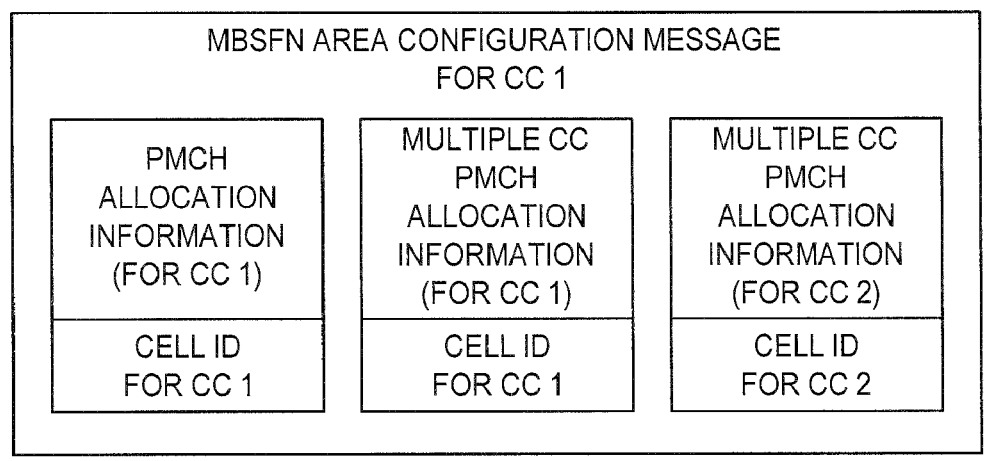
FIG. 35 is a diagram illustrated to describe a second example of MBSFN area configuration information including information that indicates a multiple CC PMCH.

FIG. 35 is a diagram illustrated to describe a second example of the MBSFN area configuration information that includes information indicating a multiple CC PMCH. The diagram is illustrated to describe a second example of the MBSFN area configuration information that includes information indicating a multiple CC PMCH. Referring to FIG. 35, one MBSFN area configuration message is illustrated as the MBSFN area configuration information. The one MBSFN area configuration message includes three pieces of PMCH allocation information. In this example, one of the three pieces of PMCH allocation information is normal PMCH allocation information for CC 1 (i.e. it indicates PMCH of CC 1). In addition, the remaining two of the three pieces of PMCH allocation information are multiple CC PMCH allocation information for CC 1 and CC 2. These two pieces of multiple CC PMCH allocation information indicate a multiple CC PMCH that covers CC 1 and CC 2. For example, the multiple CC PMCH allocation information for CC 1 includes a radio resource (subframe) of the CC 1 allocated to the multiple CC PMCH and identification information of another CC in which the multiple CC PMCH is located (e.g., cell ID of CC 2). For example, the multiple CC PMCH allocation information for CC 2 includes a radio resource (subframe) of the CC 2 allocated to the multiple CC PMCH and identification information of another CC in which the multiple CC PMCH is located (e.g., cell ID of CC 1). In addition, when a plurality of multiple CC PMCHs covering CC 1 and CC 2 are set, the multiple CC PMCH allocation information for each of CC 1 and CC2 may further include identification information for identifying the multiple CC PMCH. Accordingly, radio resources are associated between CCs, and thus it is possible for the terminal device 200-2 to specify the multiple CC PMCH.

For example, the base station 100-2 transmits the MBSFN area configuration information as described above on the MCCH. The terminal device 200-2 specifies the multiple CC PMCH based on the MBSFN area configuration information. Various types of MBSFN area configuration information that includes information indicating the multiple CC PMCH can be applicable, but not limited to examples illustrated in FIGS. 34 and 35. The detailed description will be given of the multiple CC PMCH with reference to FIGS. 36 and 37.

Figure 36:
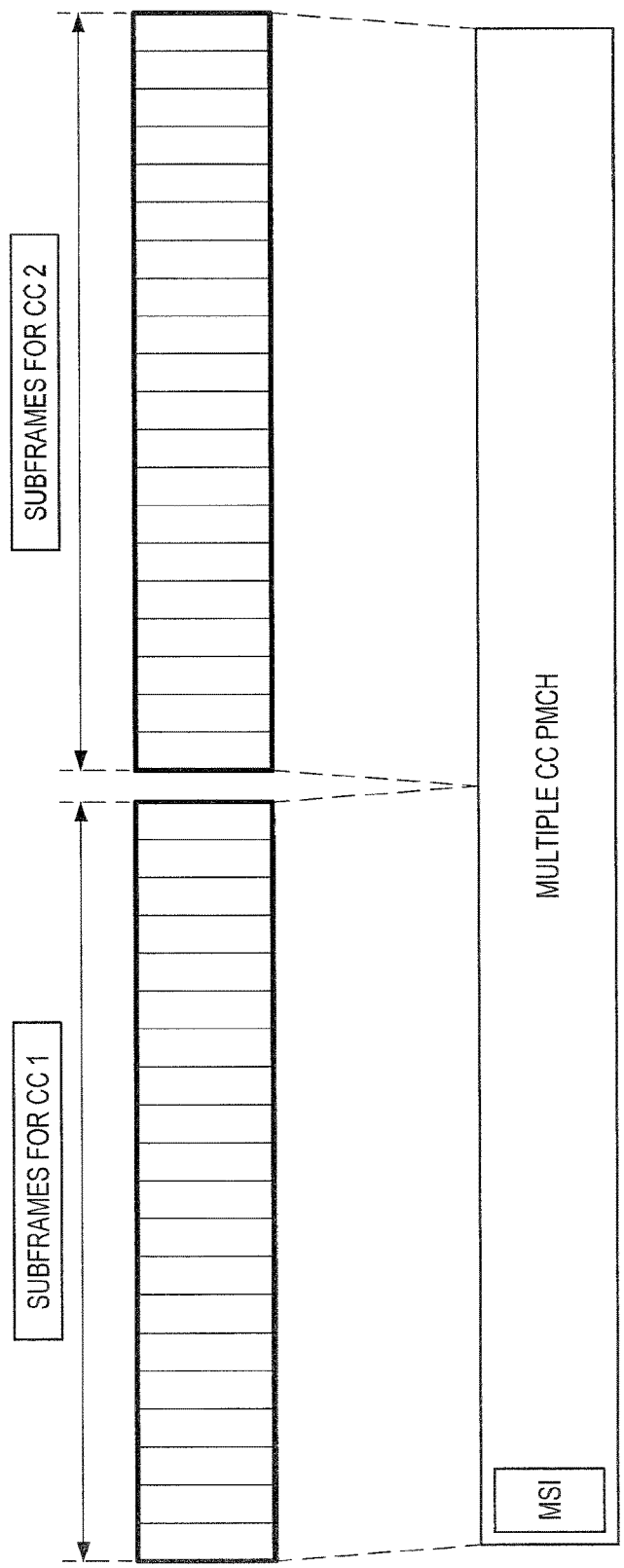
FIG. 36 is a diagram illustrated to describe a first example of the multiple CC PMCH.

FIG. 36 is a diagram illustrated to describe a first example of the multiple CC PMCH. Referring to FIG. 36, the subframe for PMCH with respect to each of CC 1 and CC 2 is illustrated. In this example, all the subframes for PMCH are allocated to one multiple CC PMCH. The MSI for the multiple CC PMCH is transmitted through the head portion of the multiple CC PMCH (e.g., one or more subframes in the head).

Figure 37:
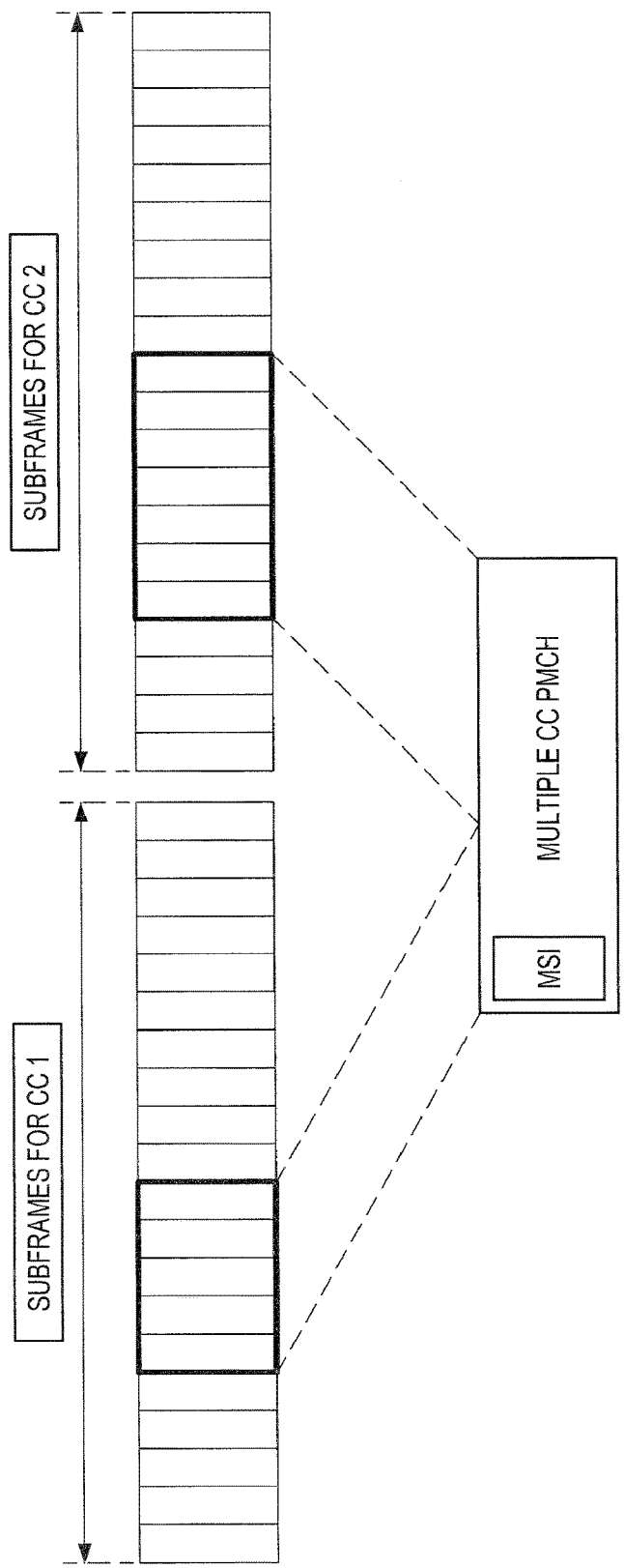
FIG. 37 is a diagram illustrated to describe a second example of the multiple CC PMCH.

FIG. 37 is a diagram illustrated to describe a second example of the multiple CC PMCH. Referring to FIG. 36, the subframe for PMCH with respect to each of CC 1 and CC 2 is illustrated. In this example, some of subframes for PMCH, rather than all the subframes for PMCH, are allocated one multiple CC PMCH. The MSI for the multiple CC PMCH is transmitted through the head portion of the multiple CC PMCH (e.g., one or more subframes in the head). The remaining subframes may be allocated to a different multiple CC PMCH or may be allocated to a PMCH for each CC.

The second modification of the second embodiment has been described above. According to the second modification of the second embodiment, it is possible to transmit one MBMS session (or one MTCH) using a plurality of radio resources. Thus, for example, according to the second modification, it is possible to broadcast a large amount of data (e.g., high-quality moving pictures).

5. APPLICATION EXAMPLE

Technology according to embodiments of the present disclosure is applicable to various products. For example, a base station 100 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base station 100 may be realized as any other types of base stations such as a NodeB and a base transceiver station (BTS). The base station 100 may include a main body (that is also referred to as a base station apparatus) configured to control wireless communication, and one or more remote radio heads (RRH) disposed in a different place from the main body. Additionally, various types of terminal devices to be discussed later may also operate as the base station 100 by temporarily or semi-permanently executing a base station function.

For example, a terminal device 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal device 200 may also be realized as a terminal (that is also referred to as a machine type communication (MTC) terminal) that performs machine-to-machine (M2M) communication. Furthermore, the terminal device 200 may be a wireless communication module (such as an integrated circuit module including a single die) mounted on each of the terminals.

<5.1. Application Examples Regarding Base Station>
(First Application Example)

Figure 38:
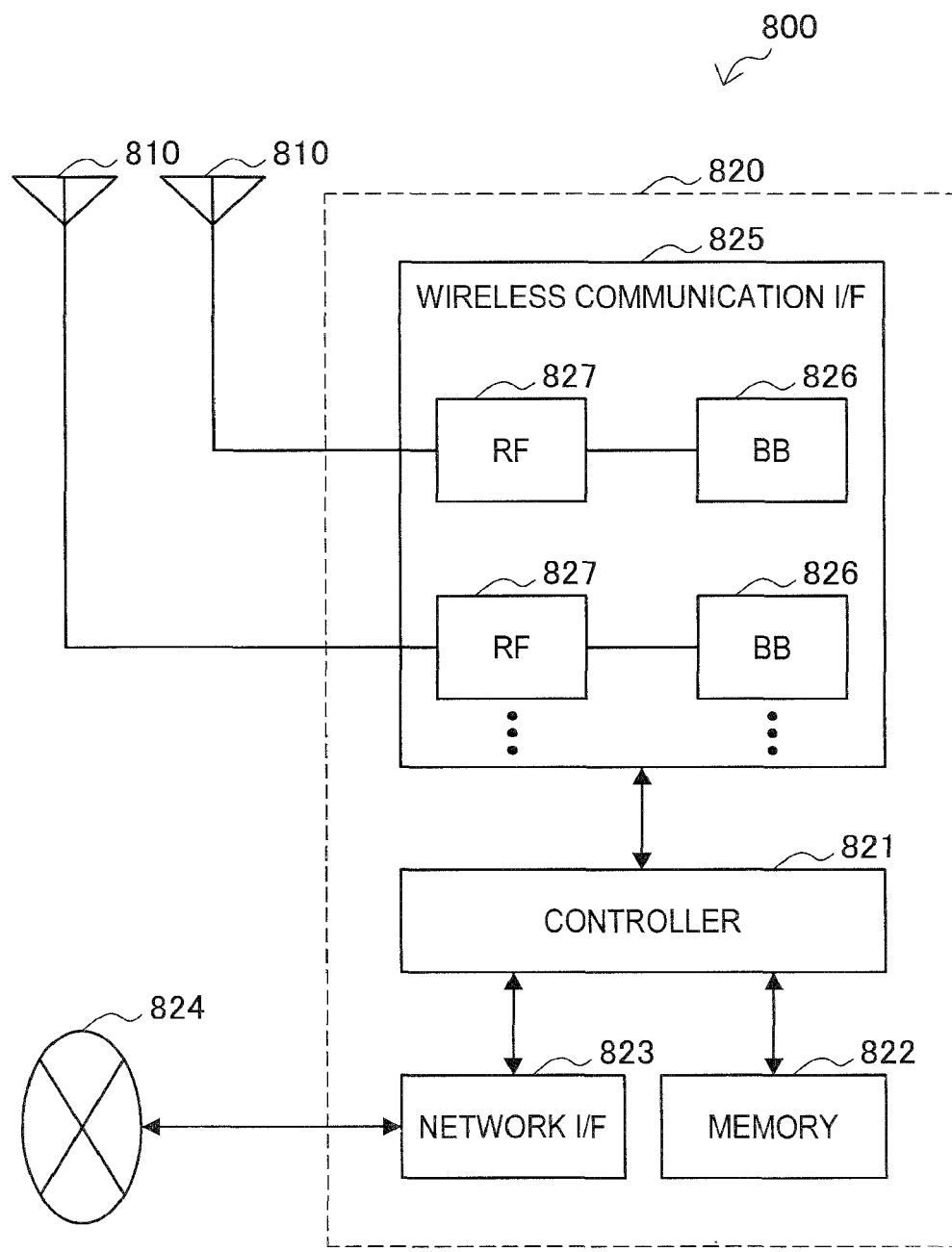
FIG. 38 is a block diagram illustrating a first example of a schematic configuration of an eNB.

FIG. 38 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive wireless signals. The eNB 800 may include the multiple antennas 810, as illustrated in FIG. 38. For example, the multiple antennas 810 may be compatible with multiple frequency bands used by the eNB 800. Although FIG. 38 illustrates the example in which the eNB 800 includes the multiple antennas 810, the eNB 800 may also include a single antenna 810.

The base station apparatus 820 includes a controller 821, a memory 822, a network interface 823, and a wireless communication interface 825.

The controller 821 may be, for example, a CPU or a DSP, and operates various functions of a higher layer of the base station apparatus 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides wireless connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

The wireless communication interface 825 may include the multiple BB processors 826, as illustrated in FIG. 38. For example, the multiple BB processors 826 may be compatible with multiple frequency bands used by the eNB 800. The wireless communication interface 825 may include the multiple RF circuits 827, as illustrated in FIG. 38. For example, the multiple RF circuits 827 may be compatible with multiple antenna elements. Although FIG. 38 illustrates the example in which the wireless communication interface 825 includes the multiple BB processors 826 and the multiple RF circuits 827, the wireless communication interface 825 may also include a single BB processor 826 or a single RF circuit 827.

(Second Application Example)

Figure 39:
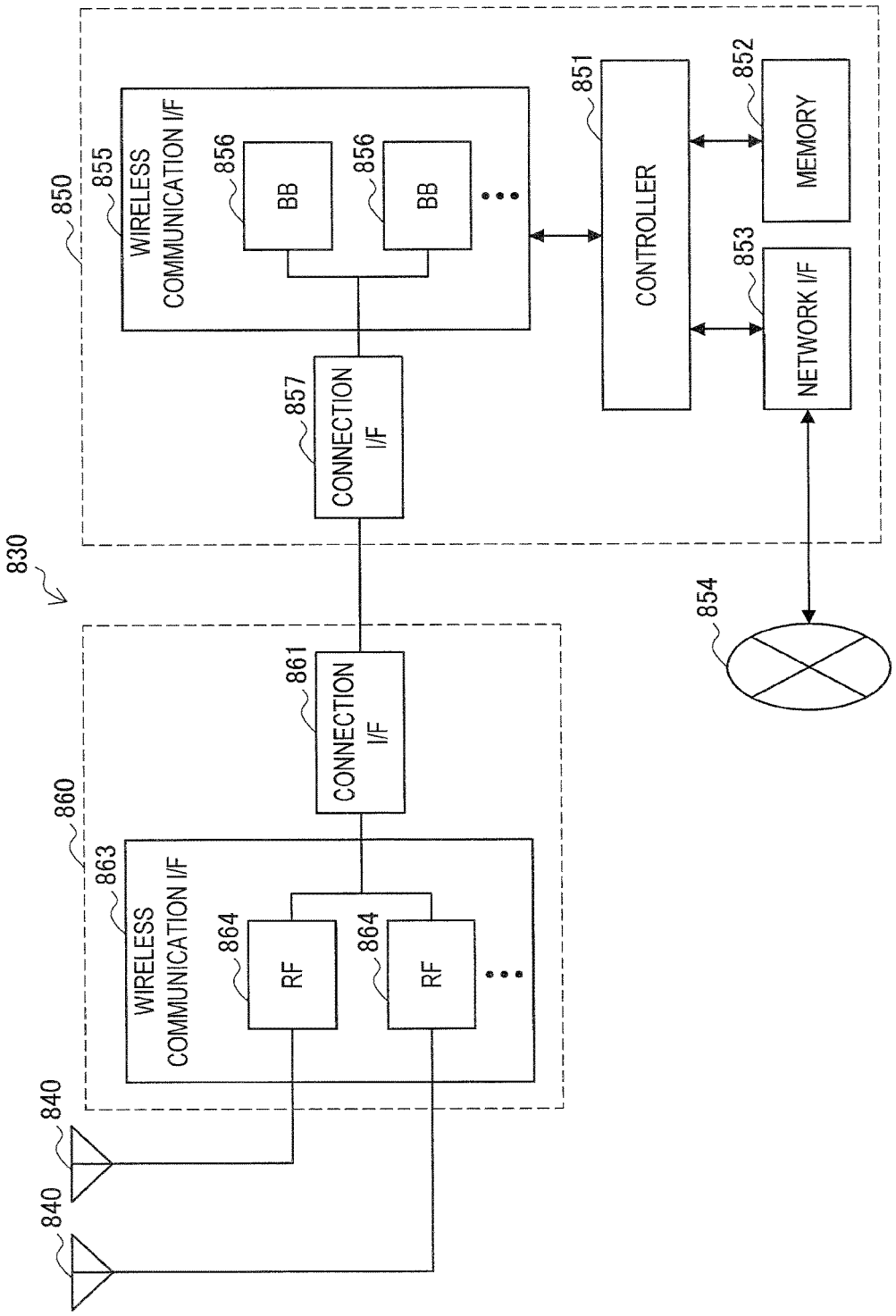
FIG. 39 is a block diagram illustrating a second example of a schematic configuration of an eNB.

FIG. 39 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive wireless signals. The eNB 830 may include the multiple antennas 840, as illustrated in FIG. 39. For example, the multiple antennas 840 may be compatible with multiple frequency bands used by the eNB 830. Although FIG. 39 illustrates the example in which the eNB 830 includes the multiple antennas 840, the eNB 830 may also include a single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 38.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 38, except the BB processor 856 is connected to the RF circuit 864 of the RRH 860 via the connection interface 857. The wireless communication interface 855 may include the multiple BB processors 856, as illustrated in FIG. 39. For example, the multiple BB processors 856 may be compatible with multiple frequency bands used by the eNB 830. Although FIG. 39 illustrates the example in which the wireless communication interface 855 includes the multiple BB processors 856, the wireless communication interface 855 may also include a single BB processor 856.

The connection interface 857 is an interface for connecting the base station apparatus 850 (wireless communication interface 855) to the RRH 860. The connection interface 857 may also be a communication module for communication in the above-described high speed line that connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station apparatus 850. The connection interface 861 may also be a communication module for communication in the above-described high speed line.

The wireless communication interface 863 transmits and receives wireless signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include multiple RF circuits 864, as illustrated in FIG. 39. For example, the multiple RF circuits 864 may support multiple antenna elements. Although FIG. 39 illustrates the example in which the wireless communication interface 863 includes the multiple RF circuits 864, the wireless communication interface 863 may also include a single RF circuit 864.

In the eNB 800 and the eNB 830 illustrated in FIG. 38 and FIG. 39 respectively, the information acquisition unit 151 and the communication control unit 153 described with reference to FIG. 8 may be provided in the wireless communication interface 825 and the wireless communication interface 855 and/or the wireless communication interface 863. In one example, the information acquisition unit 151 and the communication control unit 153 may be provided in one BB processor 826 or two or more BB processors 826, and one BB processor 856 or two or more BB processors 856. In addition, at least some of these functions may be provided in the controller 821 and the controller 851. In this regard, the information acquisition unit 161 and the communication control unit 163 described with reference to FIG. 19 are also similar to the information acquisition unit 151 and the communication control unit 153, respectively.

<5.2. Application Examples Regarding Terminal Device>
(First Application Example)

Figure 40:
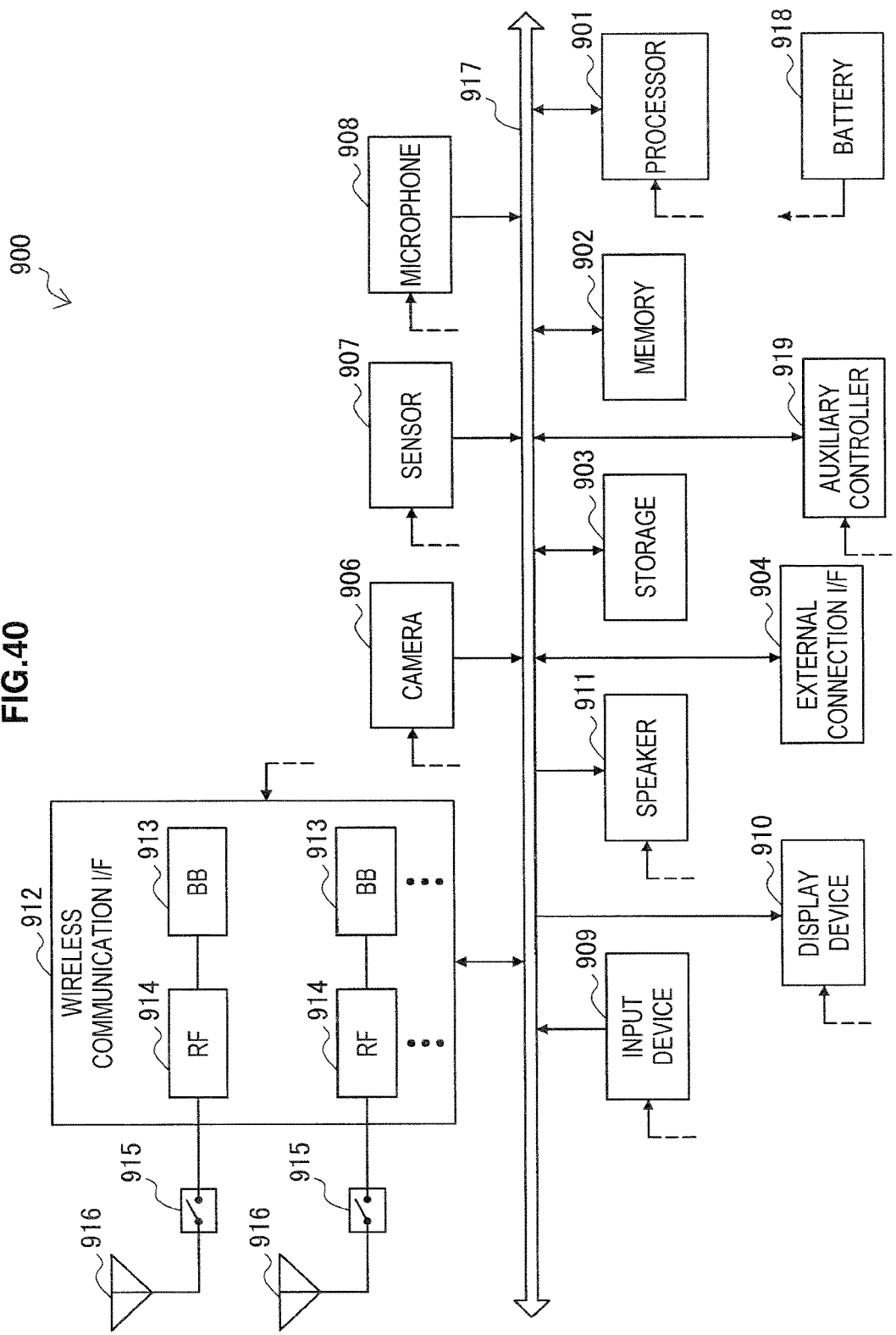
FIG. 40 is a block diagram illustrating an example of a schematic configuration of a smartphone.

FIG. 40 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives wireless signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 40. Although FIG. 40 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive wireless signals. The smartphone 900 may include the multiple antennas 916, as illustrated in FIG. 40. Although FIG. 40 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 40 via feeder lines, which are partially shown as dashed lines in the figure. The auxiliary controller 919 operates a minimum necessary function of the smartphone 900, for example, in a sleep mode.

In the smartphone 900 illustrated in FIG. 40, the information acquisition unit 261 and the communication control unit 263 described with reference to FIG. 15 may be provided in the wireless communication interface 912. In one example, the information acquisition unit 261 and the communication control unit 263 may be provided in one BB processor 913 or may be provided in two or more BB processors 913. In addition, at least some of these functions may be provided in the processor 901 or the auxiliary controller 919. In this regard, the information acquisition unit 271 and the communication control unit 273 described with reference to FIG. 26 are also similar to the information acquisition unit 261 and the communication control unit 263, respectively.

(Second Application Example)

Figure 41:
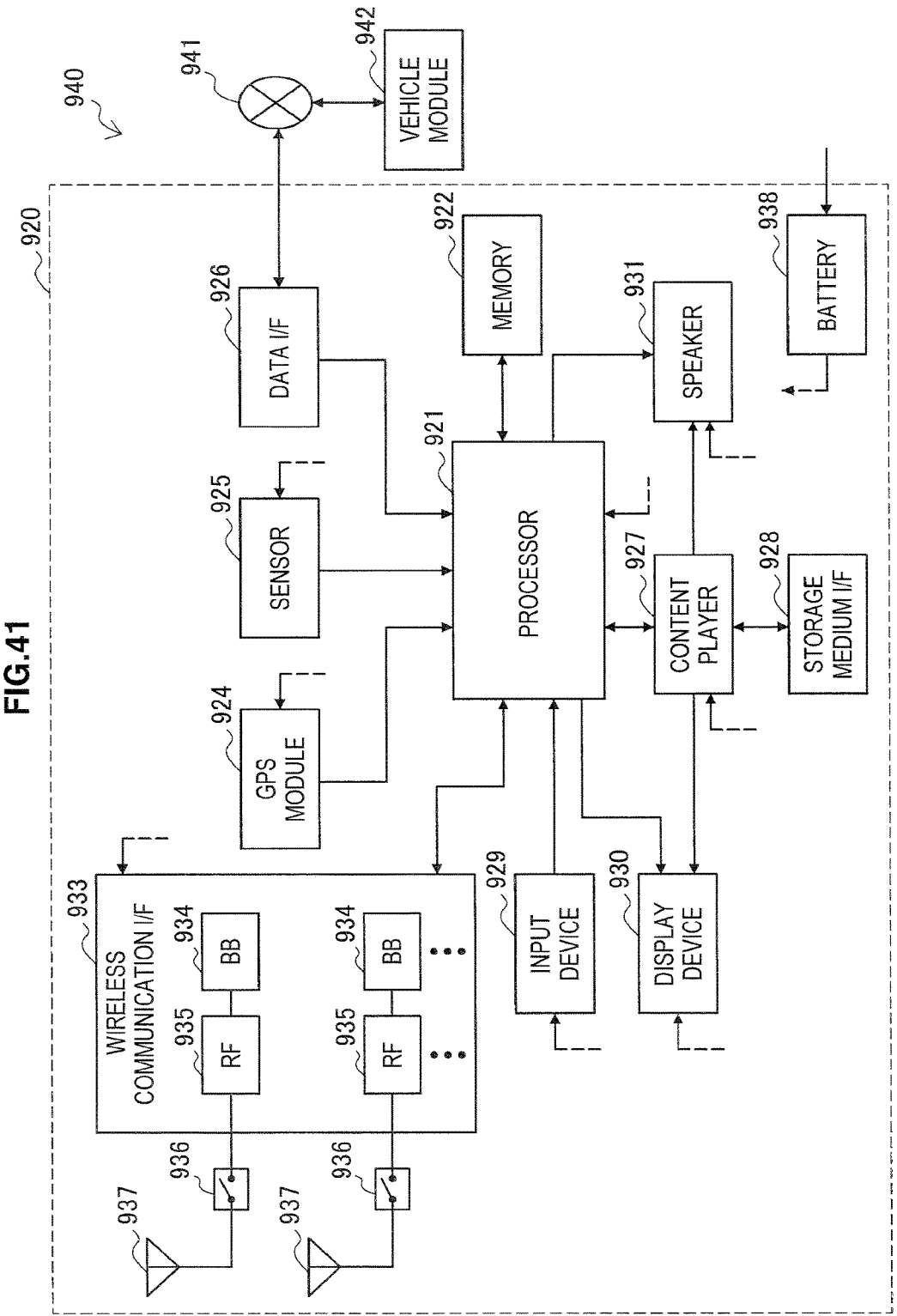
FIG. 41 is a block diagram illustrating an example of a schematic configuration of a car navigation apparatus.

FIG. 41 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives wireless signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. T4. Although FIG. T4 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive wireless signals. The car navigation apparatus 920 may include the multiple antennas 937, as illustrated in FIG. 41. Although FIG. 41 illustrates the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In that case, the antenna switches 936 may be omitted from the configuration of the car navigation apparatus 920.

The battery 938 supplies power to blocks of the car navigation apparatus 920 illustrated in FIG. 41 via feeder lines that are partially shown as dashed lines in the figure. The battery 938 accumulates power supplied form the vehicle.

In the car navigation apparatus 920 illustrated in FIG. 41, the information acquisition unit 261 and the communication control unit 263 described with reference to FIG. 15 may be provided in the wireless communication interface 933. In one example, the information acquisition unit 261 and the communication control unit 263 may be provided in one BB processor 934 or may be provided in two or more BB processors 934. In addition, at least some of these functions may be provided in the processor 921. In this regard, the information acquisition unit 271 and the communication control unit 273 described with reference to FIG. 26 are also similar to the information acquisition unit 261 and the communication control unit 263, respectively.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

6. CONCLUSION

The embodiments of the present disclosure have been described with reference to FIGS. 1 to 41.

According to the embodiments according to the present disclosure, the base station 100 is configured to include the information acquisition unit and the communication control unit. The information acquisition unit is configured to acquire the specific information used to specify the PMCH of two or more CCs including the first CC. The communication control unit is configured to control the transmission of the specific information on the first CC.

In addition, according to the embodiments according to the present disclosure, the terminal device 200 is configured to include the information acquisition unit and the communication control unit. The information acquisition unit is configured to acquire the specific information transmitted on the first CC by the base station 100 as the specific information to be used to specify the PMCH of two or more CCs including the first CC. The communication control unit is configured to specify the PMCH of the CC included in the two or more CCs based on the specific information.

Thus, it is possible to reduce the load on the MBMS for the terminal device 200 that supports carrier aggregation.

First Embodiment

In the first embodiment, the specific information is the MCCH scheduling information for the two or more CCs.

For example, this makes it possible to reduce the load on MBMS for the terminal device 200 that supports carrier aggregation. More specifically, for example, the terminal device 200, even when using two or more CCs, may be configured not to receive and acquire the MCCH scheduling information on each of the two or more CCs. For example, the MCCH scheduling information for the two or more CCs can be received and acquired using one CC. Thus, it is possible to reduce the load on the terminal device 200 to specify the radio resource in which the MCCH is located (i.e. radio frame and subframe).

Second Embodiment

In the second embodiment, the specific information is the MBSFN area configuration information for the two or more CCs.

For example, this makes it possible to reduce the load on the MBMS for the terminal device 200 that supports carrier aggregation. More specifically, for example, even when two or more CCs are used, it is not necessary for the terminal device 200 to receive and acquire the MBSFN area configuration message for each of the two or more CCs. For example, the MBSFN area configuration information for the two or more CCs can be received and acquired using one CC. Thus, it is possible to reduce the load on the terminal device 200 to specify the PMCH (i.e. subframe allocated to the PMCH).

Furthermore, it is not necessary for the terminal device 200 to receive and acquire the MCCH scheduling information on each of the two or more CCs, but the MCCH scheduling information may be received and acquired, for example, using one CC. Thus, the load on the terminal device 200 can be further reduced.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the example in which the communication system is a system compliant with LTE, LTE-Advanced, or communication standards conforming thereto has been described, but the present disclosure is not limited to the example. For example, the communication system may be a system compliant with other communication standards.

In addition, a computer program, which allows hardware such as a processor (e.g., CPU and DSP) and a memory (e.g., ROM and RAM) provided in the node described herein (e.g., base station and/or terminal device) to function as a component of the node (e.g., information acquisition unit and communication control unit) can be created. Furthermore, a storage medium used to store the computer program may be provided. Moreover, a device, which is equipped with a memory used to store the computer program and one or more processors (e.g., a processing circuit, a chip, or a module (in one example, BB processor)) capable of executing the computer program, may be provided.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
An apparatus including:
an acquisition unit configured to acquire specific information used to specify a physical multicast channel (PMCH) of two or more component carriers including a first component carrier; and
a control unit configured to control transmission of the specific information on the first component carrier.

(2)
The apparatus according to (1),
wherein the specific information is scheduling information of a multicast control channel (MCCH) for the two or more component carriers.

(3)
The apparatus according to (2),
wherein the scheduling information includes an MCCH offset, an MCCH repetition period, and subframe allocation information.

(4)
The apparatus according to (2) or (3),
wherein the acquisition unit acquires a predetermined system information block including the scheduling information, and
wherein the control unit controls transmission of the predetermined system information block on the first component carrier.

(5)
The apparatus according to (4),
wherein the scheduling information includes one or more pieces of individual scheduling information, and
wherein each of the one or more pieces of individual scheduling information is scheduling information of an MCCH for at least one component carrier of the two or more component carriers.

(6)
The apparatus according to (5),
wherein the one or more pieces of individual scheduling information include scheduling information that is common between at least two component carriers included in the two or more component carriers.

(7)
The apparatus according to (5) or (6),
wherein the acquisition unit acquires a predetermined system information block including the specific information,
wherein the control unit controls transmission of the predetermined system information block on the first component carrier, and
wherein the predetermined system information block includes the one or more pieces of individual scheduling information and identification information of a component carrier corresponding to each of the one or more pieces of individual scheduling information.

(8)
The apparatus according to any one of (4) to (7),
wherein the predetermined system information block further includes notification information for the two or more component carriers, the notification information being used for notifying a terminal device of a location of information used to indicate a change of an MCCH, and
wherein the notification information includes at least one of a notification indicator and a notification configuration.

(9)
The apparatus according to (1),
wherein the specific information is multimedia broadcast multicast services (MBMS) over a single frequency network (MBSFN) area configuration information for the two or more component carriers.

(10)
The apparatus according to (9),
wherein the control unit control transmission of the MBSFN area configuration information on an MCCH of the first component carrier.

(11)
The apparatus according to (10),
wherein the MBSFN area configuration information includes one or more MBSFN area configuration messages, and
wherein each of the one or more MBSFN area configuration messages is an MBSFN area configuration message for at least one component carrier of the two or more component carriers.

(12)
The apparatus according to (11),
wherein the one or more MBSFN area configuration messages includes an MBSFN area configuration message that is common between at least two component carriers included in the two or more component carriers.

(13)
The apparatus according to (11) or (12),
wherein the information transmitted on the MCCH includes the one or more MBSFN area configuration messages and identification information of a component carrier corresponding to each of the one or more MBSFN area configuration messages.

(14)
The apparatus according to (10),
wherein the MBSFN area configuration information includes one MBSFN area configuration message including one or more pieces of PMCH allocation information, and
wherein each of the one or more pieces of PMCH allocation information is PMCH allocation information for at least one component carrier of the two or more component carriers.

(15)
The apparatus according to (14),
wherein each of the one or more pieces of PMCH allocation information includes at least a PMCH information list.

(16)
The apparatus according to (14) or (15),
wherein the one or more pieces of PMCH allocation information include PMCH allocation information that is common between at least two component carriers included in the two or more component carriers.

(17)
The apparatus according to any one of (14) to (16),
wherein the one MBSFN area configuration message includes the one or more pieces of PMCH allocation information and identification information of a component carrier corresponding to the one or more pieces of PMCH allocation information.

(18)
The apparatus according to any one of (10) to (17),
wherein the MBSFN area configuration information includes information that indicates a PMCH covering at least two component carriers included in the two or more component carriers.

(19)
A method including:
acquiring specific information used to specify a PMCH of two or more component carriers including a first component carrier; and
controlling transmission of the specific information on the first component carrier by a processor.

(20)

An apparatus including:
an acquisition unit configured to acquire specific information transmitted on a first component carrier by a base station, the specific information being used to specify a PMCH of two or more component carriers including the first component carrier; and
a control unit configured to specify a PMCH of a component carrier included in the two or more component carriers based on the specific information.

REFERENCE SIGNS LIST 1 communication system
10 cell
100 base station
151, 161 information acquisition unit
153, 163 communication control unit
200 terminal device
261, 271 information acquisition unit
263, 273 communication control unit

The invention claimed is:
1. An apparatus comprising:
circuitry configured to
acquire scheduling information of a MCCH (multicast control channel) for two or more component carriers including a first component carrier;
acquire MBSFN (multimedia broadcast multicast services (MBMS) over a single frequency network) area configuration information for the two or more component carriers;
control transmission of a predetermined system information block comprising the scheduling information for the two or more component carriers on the first component carrier to a terminal device, the scheduling information being used by the terminal device to specify the MCCH and acquire the MBSFN area configuration information using the specified MCCH; and
control transmission of the MBSFN area configuration information on the MCCH of the first component carrier specified by the scheduling information to the terminal device, the MBSFN area configuration information being used by the terminal device to specify a PMCH (physical multicast channel) of the two or more component carriers to which desired MBMS session is mapped and acquire the desired MBMS session using the specified PMCH.
2. The apparatus according to claim 1,
wherein the scheduling information comprises an MCCH offset, an MCCH repetition period, and subframe allocation information.
3. The apparatus according to claim 1,
wherein the circuitry is configured to:
acquire the predetermined system information block comprising the scheduling information.
4. The apparatus according to claim 3,
wherein the scheduling information comprises one or more pieces of individual scheduling information, and
wherein each of the one or more pieces of individual scheduling information is scheduling information of an MCCH for at least one component carrier of the two or more component carriers.
5. The apparatus according to claim 4,
wherein the one or more pieces of individual scheduling information comprise scheduling information that is common between at least two component carriers included in the two or more component carriers.
6. The apparatus according to claim 4,
wherein the predetermined system information block comprises the one or more pieces of individual scheduling information and identification information of a component carrier corresponding to each of the one or more pieces of individual scheduling information.
7. The apparatus according to claim 3,
wherein the predetermined system information block further comprises notification information for the two or more component carriers, the notification information being used for notifying a terminal device of a location of information used to indicate a change of an MCCH, and
wherein the notification information comprises at least one of a notification indicator and a notification configuration.
8. The apparatus according to claim 1,
wherein the MBSFN area configuration information comprises one or more MBSFN area configuration messages, and
wherein each of the one or more MBSFN area configuration messages is an MBSFN area configuration message for at least one component carrier of the two or more component carriers.
9. The apparatus according to claim 8,
wherein the one or more MBSFN area configuration messages comprises an MBSFN area configuration message that is common between at least two component carriers included in the two or more component carriers.
10. The apparatus according to claim 8,
wherein the information transmitted on the MCCH comprises the one or more MBSFN area configuration messages and identification information of a component carrier corresponding to each of the one or more MBSFN area configuration messages.
11. The apparatus according to claim 1,
wherein the MBSFN area configuration information comprises one MBSFN area configuration message comprising one or more pieces of PMCH allocation information, and
wherein each of the one or more pieces of PMCH allocation information is PMCH allocation information for at least one component carrier of the two or more component carriers.
12. The apparatus according to claim 11,
wherein each of the one or more pieces of PMCH allocation information comprises at least a PMCH information list.
13. The apparatus according to claim 11,
wherein the one or more pieces of PMCH allocation information comprise PMCH allocation information that is common between at least two component carriers included in the two or more component carriers.
14. The apparatus according to claim 11,
wherein the one MBSFN area configuration message comprises the one or more pieces of PMCH allocation information and identification information of a component carrier corresponding to the one or more pieces of PMCH allocation information.
15. The apparatus according to claim 1,
wherein the MBSFN area configuration information comprises information that indicates a PMCH covering at least two component carriers included in the two or more component carriers.

16. A method comprising:

acquiring scheduling information of a MCCH (multicast control channel) for two or more component carriers including a first component carrier;

acquiring MBSFN (multimedia broadcast multicast services (MBMS) over a single frequency network) area configuration information for the two or more component carriers;

controlling, using circuitry, transmission of a predetermined system information block comprising the scheduling information for the two or more component carriers on the first component carrier to a terminal device, the scheduling information being used by the terminal device to specify the MCCH and acquire the MBSFN area configuration information using the specified MCCH; and controlling, using the circuitry, transmission of the MBSFN area configuration information on the MCCH of the first component carrier specified by the scheduling information to the terminal device, the MBSFN area configuration information being used by the terminal device to specify a PMCH (physical multicast channel) of the two or more component carriers to which desired MBMS session is mapped and acquire the desired MBMS session using the specified PMCH.

17. An apparatus comprising:

circuitry configured to acquire scheduling information of a MCCH (multicast control channel) for two or more component carriers including a first component carrier, the scheduling information being transmitted within a predetermined system information block on the first component carrier by a base station;

specify the MCCH based on the acquired scheduling information;

acquire MBSFN (multimedia broadcast multicast services (MBMS) over a single frequency network) area configuration information for the two or more component carriers using the specified MCCH, the MBSFN area configuration information being transmitted on the MCCH of the first component carrier specified by the scheduling information by the base station;

specify a PMCH (physical multicast channel) of the two or more component carriers to which desired MBMS session is mapped; and acquire the desired MBMS session using the specified PMCH.

* * * * *